US012695655B2

(12) United States Patent     (10) Patent No.:   US 12,695,655 B2

Xue et al.     (45) Date of Patent:    *Jul. 28, 2026

---

(54) METHOD AND APPARATUS FOR OBTAINING REFERENCE SIGNAL

(71) Applicant: HUAWEI TECHNOLOGIES CO., LTD., Shenzhen (CN)

(72) Inventors: Lixia Xue, Beijing (CN); Xu Zhang, Beijing (CN); Yongxing Zhou, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,815

(22) Filed: Apr. 1, 2024

(65) Prior Publication Data

US 2024/0323070 A1     Sep. 26, 2024

Related U.S. Application Data

(63) Continuation of application No. 17/686,094, filed on Mar. 3, 2022, now Pat. No. 11,962,449, which is a (Continued)

(30) Foreign Application Priority Data

Aug. 11, 2017    (CN) .......................... 201710687455.9

(51) Int. Cl.
*H04L 27/26*     (2006.01)
*H04L 5/00*     (2006.01)
(Continued)

(52) U.S. Cl.
CPC ............ *H04L 27/2613* (2013.01); *H04L 5/00* (2013.01); *H04L 5/0048* (2013.01);
(Continued)

(58) Field of Classification Search
CPC . H04L 27/2613; H04L 5/0051; H04L 5/0007; H04W 76/27; H04W 72/042; H04B 7/0452
See application file for complete search history.

(56) References Cited

U.S. PATENT DOCUMENTS

| | | | |
|---|---|---|---|
| 7,551,937 B2 | 6/2009 | Kim et al. | |
| 2012/0307868 A1 | 12/2012 | Zhou et al. | |

(Continued)

FOREIGN PATENT DOCUMENTS

| | | |
|---|---|---|
| CN | 102158449 | 8/2011 |
| CN | 103444243 | 12/2013 |

(Continued)

OTHER PUBLICATIONS

3GPP TS 38.104 V0.1.0, "3rd Generation Partnership Project; Technical Specification Group Radio Access Network; NR; Base Station (BS) radio transmission and reception (Release 15)," Jul. 2017, 19 pages.

(Continued)

*Primary Examiner* — Dady Chery

(74) *Attorney, Agent, or Firm* — Fish & Richardson P.C.

(57)      ABSTRACT

This application relates to the mobile communications field, and in particular, to a technology for obtaining a reference signal in a wireless communications system. In a method for obtaining a reference signal, a terminal device obtains position offset information; the terminal device obtains a first sequence based on the position offset information; and the terminal device demodulates, by using the first sequence, a control channel signal carried in a control channel resource set, to obtain downlink control information. In this way, MU-MIMO transmission performance is improved.

15 Claims, 15 Drawing Sheets

Related U.S. Application Data continuation of application No. 16/894,011, filed on Jun. 5, 2020, now Pat. No. 11,283,660, which is a continuation of application No. 16/355,157, filed on Mar. 15, 2019, now Pat. No. 10,693,694, which is a continuation of application No. PCT/CN2018/095881, filed on Jul. 17, 2018.

(51) Int. Cl.

| | |
|---|---|
| *H04W 72/04* | (2023.01) |
| *H04W 72/23* | (2023.01) |
| *H04W 76/27* | (2018.01) |
| *H04W 88/02* | (2009.01) |
| *H04B 7/0452* | (2017.01) |

(52) U.S. Cl.
CPC ........ *H04L 5/0051* (2013.01); *H04L 27/2666* (2013.01); *H04W 72/04* (2013.01); *H04W 72/23* (2023.01); *H04W 76/27* (2018.02); *H04W 88/02* (2013.01); *H04B 7/0452* (2013.01); *H04L 5/0007* (2013.01)

(56) References Cited

U.S. PATENT DOCUMENTS

| | | | |
|---|---|---|---|
| 2013/0022082 A1 | 1/2013 | Zhou et al. | |
| 2014/0307700 A1 | 10/2014 | Seo et al. | |
| 2015/0117338 A1 | 4/2015 | Janis et al. | |
| 2015/0155991 A1 | 6/2015 | Papasakellariou et al. | |
| 2015/0318972 A1 | 11/2015 | Zhang et al. | |
| 2015/0326362 A1 | 11/2015 | Xiong et al. | |
| 2016/0338056 A1 | 11/2016 | Xue et al. | |
| 2017/0048829 A1 | 2/2017 | Hakseong et al. | |
| 2018/0167946 A1 | 6/2018 | Si et al. | |
| 2019/0074932 A1 | 3/2019 | Kim et al. | |
| 2019/0166619 A1 | 5/2019 | Takeda et al. | |
| 2019/0174567 A1* | 6/2019 | Kusashima ........... | H04L 5/0048 |

FOREIGN PATENT DOCUMENTS

| | | |
|---|---|---|
| CN | 103748821 | 4/2014 |
| CN | 104125643 | 10/2014 |
| CN | 104904305 | 9/2015 |
| CN | 105766023 | 7/2016 |
| CN | 106455040 | 2/2017 |
| CN | 106953720 | 7/2017 |
| JP | 2017509218 | 3/2017 |
| KR | 20140080021 | 6/2014 |
| RU | 2536816 | 12/2014 |
| WO | WO2011046387 | 4/2011 |
| WO | WO2011120433 | 10/2011 |
| WO | WO2015109866 | 7/2015 |

OTHER PUBLICATIONS

3GPP TS 38.211 V0.1.0 (Jun. 2017);3rd Generation Partnership Project; Technical Specification Group Radio Access Network; NR; Physical channels and modulation(Release 15), total 22 pages.

3GPP TS 38.331 V0.0.4 (Jun. 2017);3rd Generation Partnership Project; Technical Specification Group Radio Access Network; NR; Radio Resource Control (RRC);Protocol specification(Release 15), total 22 pages.

CMCC, "Coreset Configuration for RMSI Scheduling," 3GPP TSG RAN WG1 Meeting NR Ad-Hoc #2, R1-1710773, Qingdao, China, Jun. 27-30, 2017, 4 pages.

Ericsson, "NB-IoT—Remaining issues for NPBCH and MIB," 3GPP TSG RAN WG1 Nb-Iot Ad-Hoc Meeting, R1-161820, Sophia Antipolis, France, Mar. 22-24, 2016, 6 pages.

Extended European Search Report issued in European Application No. 18844065.5 on Jul. 9, 2020, 8 pages.

Extended European Search Report issued in European Application No. 22161499.3 on Sep. 28, 2022, 10 pages.

Huawei et al., "Discussion and TP on mapping to physical resources for DMRS for PDCCH," 3GPP TSG RAN WG1 Ad Hoc Meeting, R1-1800819, Vancouver, Canada, Jan. 22-26, 2018, 8 pages.

LG Electronics, "Remaining details on wider bandwidth operation," 3GPP TSG RAN WG1 Meeting Ad-Hoc, R1-1710352, Qingdao, P.R. China, Jun. 27-30, 2017, 9 pages.

MediaTek Inc., "Discussion on PBCH design," 3GPP TSG RAN WG1 Meeting #89, R1-1707816, Hangzhou, P.R. China, May 15-19, 2017, 7 pages.

NTT DOCOMO, Inc., "Remaining issues on wider bandwidth operations for NR," 3GPP TSG RAN WG1 NR Ad-Hoc#2, R1-1711131, Qingdao, P.R. China, Jun. 27-30, 2017, 6 pages.

Office Action issued in Chinese Application No. 201710687455.9 on Dec. 23, 2020, 10 pages.

Office Action issued in Chinese Application No. 202011423754.X on Jun. 7, 2021, 7 pages.

Office Action issued in Chinese Application No. 202011423754.X on Sep. 7, 2021, 4 pages.

Office Action issued in Japanese Application No. 2020-529792 on Mar. 3, 2021, 7 pages (with English translation).

Office Action issued in Russian Application No. 2020109673/28(015963) on Oct. 18, 2021, 20 pages (with English translation).

PCT International Search Report and Written Opinion in International Application No. PCT/US2018/095881, dated Sep. 26, 2018, 6 pages (with English translation).

Qualcomm Incorporated, "Wideband RS and Narrowband RS," 3GPP TSG RAN WG1 Meeting #88bis, R1-1705600, Spokane, USA Apr. 3-7, 2017, 7 pages.

* cited by examiner

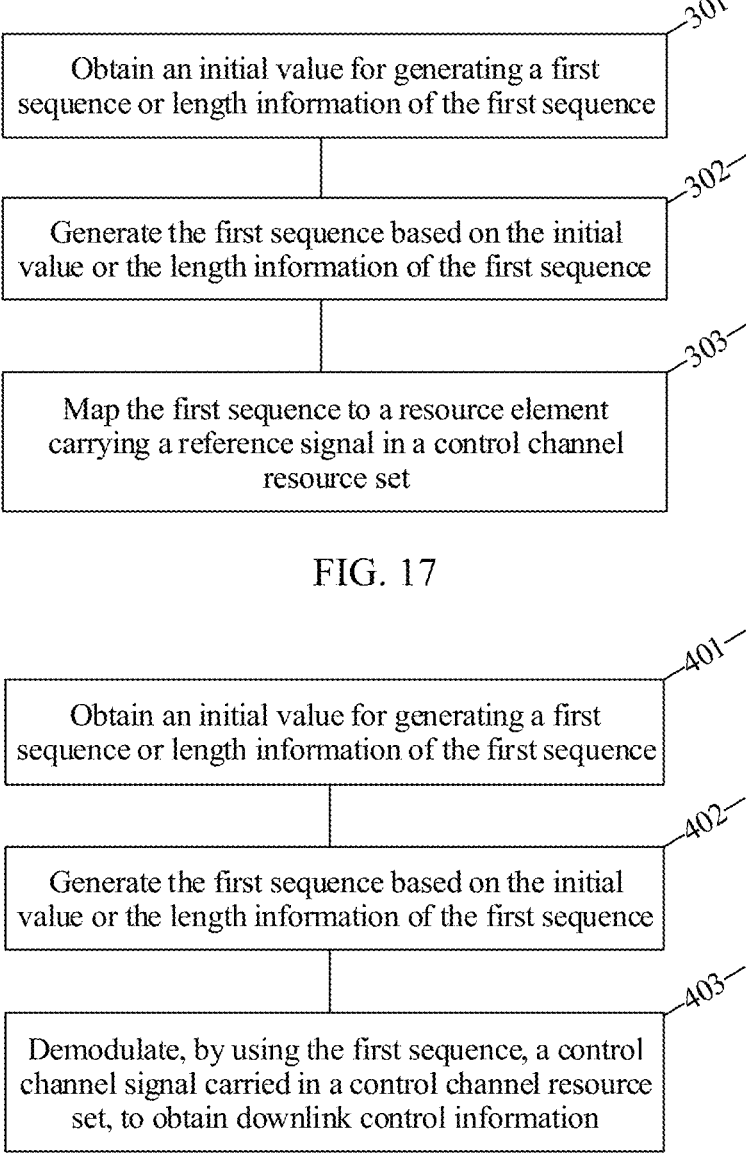

301

Obtain an initial value for generating a first sequence or length information of the first sequence

302

Generate the first sequence based on the initial value or the length information of the first sequence

303

Map the first sequence to a resource element carrying a reference signal in a control channel resource set

Obtain an initial value for generating a first sequence or length information of the first sequence

402

Generate the first sequence based on the initial value or the length information of the first sequence

403

Demodulate, by using the first sequence, a control channel signal carried in a control channel resource set, to obtain downlink control information

FIG. 18

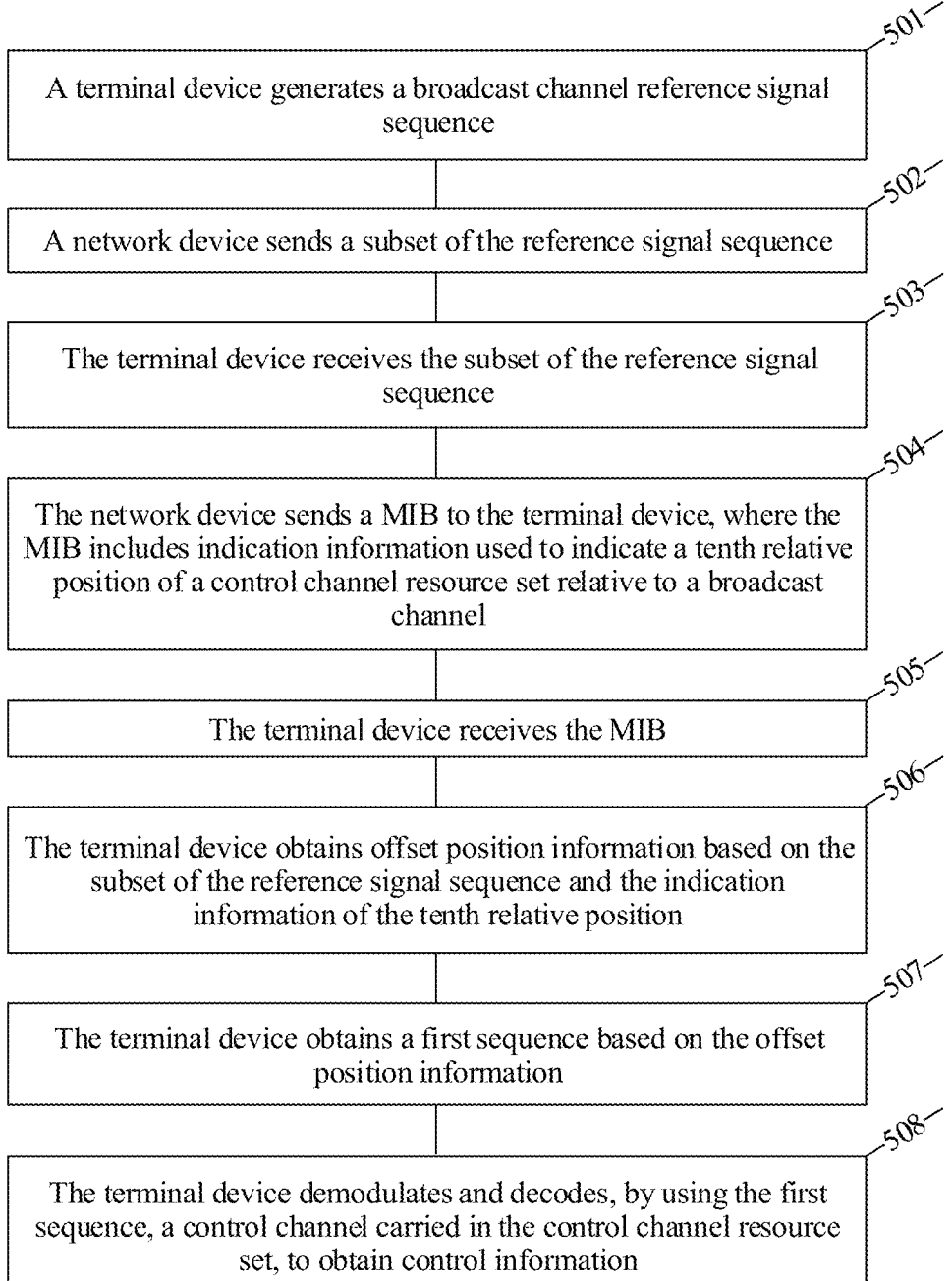

A terminal device generates a broadcast channel reference signal sequence — 501

A network device sends a subset of the reference signal sequence — 502

The terminal device receives the subset of the reference signal sequence — 503

The network device sends a MIB to the terminal device, where the MIB includes indication information used to indicate a tenth relative position of a control channel resource set relative to a broadcast channel — 504

The terminal device receives the MIB — 505

The terminal device obtains offset position information based on the subset of the reference signal sequence and the indication information of the tenth relative position — 506

The terminal device obtains a first sequence based on the offset position information — 507

The terminal device demodulates and decodes, by using the first sequence, a control channel carried in the control channel resource set, to obtain control information — 508

FIG. 19

METHOD AND APPARATUS FOR OBTAINING REFERENCE SIGNAL

CROSS-REFERENCE TO RELATED APPLICATIONS

This application is a continuation of U.S. patent application Ser. No. 17/686,094, filed on Mar. 3, 2022, which is a continuation of U.S. patent application Ser. No. 16/894,011, filed on Jun. 5, 2020, now U.S. Pat. No. 11,283,660, which is a continuation of U.S. patent application Ser. No. 16/355, 157, filed on Mar. 15, 2019, now U.S. Pat. No. 10,693,694, which is a continuation of International Application No. PCT/CN2018/095881, filed on Jul. 17, 2018, which claims priority to Chinese Patent Application No. 201710687455.9, filed on Aug. 11, 2017. All of the afore-mentioned patent applications are hereby incorporated by reference in their entireties.

TECHNICAL FIELD

This application relates to the mobile communications field, and in particular, to a technology for obtaining a reference signal in a wireless communications system.

BACKGROUND

In a Long Term Evolution (LTE) network, a base station usually allocates a part of system bandwidth regions to a specific terminal device. That is, within a specific time, resources in a specific frequency region are allocated to the terminal device. In this case, if the base station preferentially allocates high-quality resources in the specific frequency region to the terminal device, so that service quality of the terminal device is better ensured, a reference signal may provide reference for the base station during resource scheduling in this process.

At a same time, reference points of a plurality of broadcast channels coexist in frequency division multiplexing mode. For a method for generating first sequences corresponding to the reference points of the broadcast channels, refer to a method for generating a user equipment (UE) specific reference signal in the LTE network. A resource of one control channel resource set overlaps that of another control channel resource set on an orthogonal frequency division multiplexing (OFDM) symbol, and first sequences on reference signal resources included in resource element groups (REGs) on overlapping time-frequency resources are different.

Because a plurality of control channel resource sets overlap each other on time-frequency resources, and initial values of different reference signal sequences are different, sizes of overlapping resources do not affect configuration modes of the reference signal sequences. Consequently, reference signal sequences mapped to the overlapping resources are different, orthogonal code division multiplexing of a plurality of reference signals on the overlapping resources cannot be implemented, and multi-user multiple-input multiple-output (MU-MIMO) transmission performance is limited.

SUMMARY

Embodiments of the present invention provide a method and an apparatus for obtaining a reference signal, and a system to improve MU-MIMO transmission performance.

According to a first aspect, an embodiment of this application provides a method for obtaining a reference signal. The method includes: obtaining, by a terminal device, position offset information; obtaining a first sequence based on the position offset information; and demodulating.

In a possible design, the method further includes: generating, by the terminal device, a reference signal sequence; and obtaining the first sequence from the reference signal sequence based on the position offset information, where the first sequence is a subset of the reference signal sequence.

In a possible design, the method further includes: receiving, by the terminal device, a master information block (MIB) sent by a network device, where the MIB includes indication information of a first relative position and indication information of a second relative position, the first relative position is a position of a reference point of a broadcast channel carrying the MIB, relative to a frequency domain reference point, and the second relative position is a relative position of the control channel resource set relative to the reference point of the broadcast channel; and determining the position offset information according to the first relative position indicated by the indication information of the first relative position and the second relative position indicated by the indication information of the second relative position.

According to this solution, when reference points of a plurality of broadcast channels are sent in different frequency domain positions, reference signals used by control channel resources configured for reference points of different broadcast channels are selected from a same sequence. In addition, even if a plurality of control channel resources overlap each other, a same sequence in an overlapping region, and further, resource reuse by a plurality of users, for example, orthogonal MU-MIMO, can be implemented in the overlapping resource region. In addition, the MIB includes the position offset information of the control channel resources. This is advantageous to forward compatibility, and can flexibly avoid interference from a signal sent by a neighboring cell on the control channel resources.

In a possible design, the method further includes: receiving, by the terminal device, a MIB sent by a network device, where the MIB includes indication information used to indicate a third relative position, and the third relative position is a position of a reference point of a broadcast channel carrying the MIB, relative to a frequency domain reference point; and the obtaining, by a terminal device, position offset information includes: determining, by the terminal device, the position offset information according to the third relative position indicated by the indication information of the third relative position and a fourth relative position, where the fourth relative position is a relative position of the control channel resource set relative to the reference point of the broadcast channel, and the fourth relative position is configured or preset.

According to this solution, when a plurality of broadcast channels are sent in different frequency domain positions, reference signals used by control channel resources configured for reference points of different broadcast channels are selected from a same sequence. In addition, even if a plurality of control channel resources overlap each other, same sequences are used in an overlapping region, and further, resource reuse by a plurality of users, for example, orthogonal MU-MIMO, can be implemented in the overlapping resource region.

In a possible design, the method further includes: receiving, by the terminal device, a master information block MIB, where the MIB includes indication information used to indicate eighth relative position information of the control channel resource set relative to a frequency domain reference point; and the obtaining, by a terminal device, position offset information includes: determining, by the terminal device, the position offset information according to the eighth relative position indicated by the indication information of the eighth relative position.

When a plurality of broadcast channels may be sent in different frequency domain positions, if this solution is used, a same frequency domain reference point may be referenced by the obtained first sequence. Therefore, a plurality of overlapping control channel resources can share a same reference signal sequence, and further, resource reuse by a plurality of users, for example, orthogonal MU-MIMO, can be implemented. In addition, relative position information of a control channel relative to a reference point of a broadcast channel and relative position information of the reference point of the broadcast channel relative to the frequency domain reference point can be jointly encoded for indicating. This improves coding efficiency and reduces indication signaling overheads.

In a possible design, the method further includes: receiving, by the terminal device, configuration information of a bandwidth, where the bandwidth is a part of a system bandwidth, the configuration information includes indication information of a fifth relative position, and the fifth relative position is a relative position of a bandwidth comprising the control channel resource set relative to a frequency domain reference point; and the obtaining, by a terminal device, position offset information includes: determining, by the terminal device, the position offset information according to the fifth relative position indicated by the indication information of the fifth relative position.

According to this solution, the configuration information of the bandwidth may be carried in remaining minimum system information (RMSI) other than a MIB. Therefore, indication signaling overheads of the MIB are reduced. In addition, the RMSI may carry more bit information, and further, an offset of a bandwidth in frequency domain may be more flexible, that is, an offset granularity in frequency domain may be smaller. Therefore, the offset of the bandwidth is more flexible, and resource utilization can be improved.

In a possible design, the method further includes: receiving, by the terminal device, configuration information of a bandwidth, where the bandwidth is a part of a system bandwidth, the configuration information includes indication information of a sixth relative position and indication information of a seventh relative position, the sixth relative position is a relative position of a bandwidth comprising the control channel resource set relative to a reference point of a broadcast channel carrying a MIB, and the seventh relative position is a position of the reference point of the broadcast channel carrying the MIB, relative to a frequency domain reference point; and the obtaining, by a terminal device, position offset information includes: determining the position offset information according to the sixth relative position indicated by the indication information of the sixth relative position and the seventh relative position indicated by the indication information of the seventh relative position.

According to this solution, the configuration information of the bandwidth may be carried in RMSI other than a MIB. Therefore, indication signaling overheads of the MIB are reduced. In addition, system information (the RMSI) may carry more bit information, and further, an offset of a bandwidth in frequency domain may be more flexible, that is, an offset granularity in frequency domain may be smaller. Therefore, the offset of the bandwidth is more flexible, and resource utilization can be improved.

In a possible design, the obtaining, by a terminal device, position offset information includes: receiving, by the terminal device, configuration information of the control channel resource set, where the configuration information of the control channel resource set includes indication information used to indicate the position offset information, obtaining, by the terminal device, the position offset information according to the indication information used to indicate the position offset information.

According to this solution, when configuring time-frequency resources of the control channel resource set, a network device obtains an overlapping resource region on the time-frequency resources, and determines the position offset information according to the overlapping resource region, and when configuring the control channel resource set, configures position offset information of a first sequence used by a control channel reference signal, so that reference signal sequences of a plurality of control channels are the same in the overlapping region. Therefore, orthogonal reuse by a plurality of users, that is, orthogonal MU-MIMO, is enabled. In addition, non-orthogonal interference between sequences that is caused by a plurality of different sequences on a same reference signal resource can be reduced.

For example, the indication information used to indicate the position offset information includes indication information used to indicate a physical resource block number of the control channel resource set; and the obtaining, by a terminal device, position offset information includes: determining, by the terminal device, the position offset information according to the indication information used to indicate the physical resource block number.

According to this solution, all control channel resources use a same physical resource block number, and a reference point of the physical resource block number may be notified by a MIB or RMSI, and further, the terminal device obtains the unified physical resource block number in frequency domain according to a same frequency domain reference point. Therefore, first sequences determined for control channel resource sets including the same physical resource block number are the same, so that first sequences of control channel resource sets with overlapping resources are the same. Therefore, orthogonal reuse by a plurality of users, that is, orthogonal MU-MIMO, is enabled.

In a possible design, the method further includes: receiving, by the terminal device, a MIB sent by a network device, where the MIB includes indication information used to indicate an eleventh relative position of the control channel resource set relative to a reference point of a broadcast channel carrying the MIB; and obtaining, by the terminal device, the second sequence from the reference signal sequence according to the indication information, where the second sequence is a subset of the reference signal sequence. In the method, the MIB does not need to carry indication information of the frequency domain reference point. Therefore, indication signaling overheads of the MIB are reduced. In addition, the frequency domain reference point is indicated by RMSI occupying more resources. Therefore, bandwidth configurations are more flexible, fragments of the bandwidth in use are reduced, and spectrum utilization is improved. The second sequence is used for a reference signal included in a first control channel resource set configured by the MIB, and the first control channel resource set includes a common search space, and mainly carries control information for scheduling the RMSI. The foregoing first sequence is used for the control channel resource set configured by RRC, and the first control channel resource set includes a common search space and/or a user specific search space, and mainly carries control information for scheduling data.

According to a second aspect, an embodiment of this application provides a method for obtaining a reference signal. The method includes: obtaining, by a network device, position offset information; obtaining a first sequence based on the position offset information.

In a possible design, the method further includes: generating, by the network device, a reference signal sequence; and obtaining the first sequence from the reference signal sequence based on the position offset information, where the first sequence is a subset of the reference signal sequence.

In a possible design, the method further includes: sending, by the network device, a MIB to a terminal device, where the MIB includes indication information of a first relative position and indication information of a second relative position, the first relative position is a position of a reference point of a broadcast channel carrying the MIB, relative to a frequency domain reference point, the second relative position is a relative position of the control channel resource set relative to the reference point of the broadcast channel, and the indication information of the first relative position and the indication information of the second relative position are used to indicate the position offset information.

In a possible design, the method further includes: receiving, by the terminal device, a MIB sent by a network device, where the MIB includes indication information of a third relative position, the third relative position is a position of a reference point of a broadcast channel carrying the MIB, relative to a frequency domain reference point, the indication information of the third relative position is used with a fourth relative position to indicate the position offset information, the fourth relative position is a relative position of the control channel resource set relative to the reference point of the broadcast channel, and the fourth relative position is configured or preset.

In a possible design, the method further includes: sending, by the network device, a master information block MIB to a terminal device, where the MIB includes indication information used to indicate eighth relative position information of the control channel resource set relative to a frequency domain reference point, and the indication information of the eighth relative position information is used to indicate the position offset information.

In a possible design, the method further includes: sending, by the network device, configuration information of a bandwidth to a terminal device, where the bandwidth is a part of a system bandwidth, the configuration information includes indication information of a fifth relative position, the fifth relative position is a relative position of a bandwidth comprising the control channel resource set relative to a frequency domain reference point, and the indication information of the fifth relative position is used to indicate the position offset information.

In a possible design, the method further includes: sending, by the network device, configuration information of a bandwidth to a terminal device, where the bandwidth is a part of a system bandwidth, the configuration information includes indication information of a sixth relative position and indication information of a seventh relative position, the sixth relative position is a relative position of a bandwidth comprising the control channel resource set relative to a reference point frequency domain position of a broadcast channel carrying a MIB, the seventh relative position is a position of the reference point of the broadcast channel carrying the MIB, relative to a frequency domain reference point, and the indication information of the sixth relative position and the indication information of the seventh relative position are used to indicate the position offset information.

In a possible design, the method further includes: sending, by the network device, configuration information of the control channel resource set to a terminal device, where the configuration information of the control channel resource set includes indication information used to indicate the position offset information. The indication information used to indicate the position offset information includes indication information used to indicate a physical resource block number of the control channel resource set.

In a possible design, the method further includes: sending, by the network device, a master information block MIB, where the MIB includes indication information used to indicate an eleventh relative position of the control channel resource set relative to a reference point of a broadcast channel carrying the MIB.

According to a third aspect, an embodiment of this application provides an apparatus for obtaining a reference signal, where the apparatus has a function for implementing actions of the terminal device in the foregoing method designs. The function may be implemented by hardware, or may be implemented by corresponding software executed by hardware. The hardware or software includes one or more modules corresponding to the foregoing function.

In a possible design, a structure of the terminal device includes a processor, where the processor is configured to: obtain position offset information, and obtain a first sequence based on the position offset information.

According to a fourth aspect, an embodiment of this application provides an apparatus for obtaining a reference signal. The apparatus has a function for implementing actions of the network device in the foregoing method designs. The function may be implemented by hardware, or may be implemented by corresponding software executed by hardware. The hardware or software includes one or more modules corresponding to the foregoing function.

In a possible design, a structure of the apparatus includes a processor, where the processor is configured to support the network device in performing corresponding functions in the foregoing method. The network device may further include a memory. The memory is coupled with the processor. The memory stores a program instruction and data required by the network device.

In a possible design, in any method in the first to the fourth aspects, the configuration information of the control channel resource set includes at least one of a random access response (RAR) and radio resource control (RRC) signaling, and the control channel resource set includes a type-1 common search space (CSS) and/or a terminal specific search space (USS).

In any one of the first to the fourth aspects, the frequency domain reference point is a system carrier bandwidth boundary or a center frequency domain position, or is a candidate position of a channel raster, where the candidate position of the channel raster is a candidate subcarrier position within the system carrier bandwidth, and the candidate subcarrier position is a predefined position; and the reference point of the broadcast channel is a center frequency domain position or a boundary of a resource on which the reference point of the broadcast channel is located.

According to a fifth aspect, an embodiment of this application provides a method for obtaining a reference signal, where the method includes: obtaining, by a terminal device, an initial value for generating a first sequence or length information of a first sequence; generating the first sequence based on the initial value or the length information of the first sequence.

In a possible design, the method further includes: receiving, by the terminal device, a MIB, where the MIB includes indication information used to indicate a time-frequency resource occupied by the control channel resource set; and determining a length of the first sequence according to the indication information used to indicate the time-frequency resource occupied by the control channel resource set.

In a possible design, the obtaining, by a terminal device, an initial value for generating a first sequence includes: obtaining, by the terminal device, one or more of a synchronization signal, a broadcast channel scrambling sequence, a broadcast channel reference signal, or broadcast information that includes the initial value for generating the first sequence.

According to the solution provided by the fifth aspect, the MIB does not include indication information of a frequency domain reference point, and therefore, indication signaling overheads of the MIB can be reduced. Therefore, the terminal device cannot obtain a position relative to the frequency domain reference point, and can only directly generate a reference signal sequence, or truncate the first sequence from a center position of a reference signal sequence. Because a size of an initial access bandwidth is limited, it is less possible that control channel resource sets sent in different frequency bands in frequency domain overlap each other in frequency domain. Therefore, reuse by a plurality of users is impossible. However, a terminal device receiving RMSI can obtain the first sequence according to a reference point configured by the RMSI, and orthogonal reuse by a plurality of users, that is, MU-MIMO, can be implemented in an overlapping resource region between a plurality of control channel resource sets.

According to a sixth aspect, an embodiment of this application provides a method for obtaining a reference signal, where the method includes: obtaining, by a network device, an initial value for generating a first sequence or length information of a first sequence; generating the first sequence based on the initial value or the length information of the first sequence.

In a possible design, the method further includes: sending, by the network device, a MIB to a terminal device, where the MIB includes indication information used to indicate a time-frequency resource occupied by the control channel resource set.

In a possible design, the method further includes: sending, by the network device, one or more of a synchronization signal, a broadcast channel scrambling sequence, a broadcast channel reference signal, or broadcast information that includes the initial value for generating the first sequence to the terminal device.

According to a seventh aspect, an embodiment of this application provides an apparatus for obtaining a reference signal, where the apparatus has a function for implementing actions of the terminal device in the foregoing method designs. The function may be implemented by hardware, or may be implemented by corresponding software executed by hardware. The hardware or software includes one or more modules corresponding to the foregoing function. The module may be software and/or hardware.

In a possible design, the terminal device includes a processor, configured to: obtain an initial value for generating a first sequence or length information of the first sequence; generate the first sequence based on the initial value or the length information of a first sequence; and demodulate, by using the first sequence, a control channel signal carried in a control channel resource set, to obtain downlink control information.

According to an eighth aspect, an embodiment of this application provides an apparatus for obtaining a reference signal, where the apparatus has a function for implementing actions of the network device in the foregoing method designs. The function may be implemented by hardware, or may be implemented by corresponding software executed by hardware. The hardware or software includes one or more modules corresponding to the foregoing function.

In a possible design, a structure of the apparatus includes a processor and a transmitter, where the processor is configured to support a network device in performing corresponding functions in the foregoing method. The apparatus may further include a memory. The memory is coupled with the processor. The memory stores a program instruction and data required by the apparatus.

According to a ninth aspect, an embodiment of this application provides a computer readable storage medium, where the computer readable storage medium stores a computer software instruction used by a terminal device, and the instruction is used to execute the method designed in the first aspect.

According to a tenth aspect, an embodiment of this application provides a readable storage medium, where the computer readable storage medium stores an instruction of a network device, and the instruction is used to execute the program designed in the second aspect.

According to an eleventh aspect, an embodiment of this application provides a computer readable storage medium, where the computer readable storage medium stores an instruction of a terminal device, and the instruction is used to execute the program designed in the fifth aspect.

According to a twelfth aspect, an embodiment of this application provides a readable storage medium, where the computer readable storage medium stores an instruction of a network device, and the instruction is used to execute the program designed in the sixth aspect.

According to a thirteenth aspect, an embodiment of this application provides a communications apparatus, including: a memory, where the memory is configured to store computer executable program code; and a processor, where when the processor executes the instruction, the apparatus is configured to implement the method according to the first aspect.

According to a fourteenth aspect, an embodiment of this application provides a communications apparatus, including: a memory, where the memory is configured to store computer executable program code; and a processor, where when the processor executes the instruction, the apparatus is configured to implement the method according to the second aspect.

According to a fifteenth aspect, an embodiment of this application provides a communications apparatus, including: a memory, where the memory is configured to store computer executable program code; and a processor, where when the processor executes the instruction, the apparatus is configured to implement the method according to the fifth aspect.

According to a sixteenth aspect, an embodiment of this application provides a communications apparatus, including: a memory, configured to store computer executable program code; and a processor, where when the processor executes the instruction, the apparatus is configured to implement the method according to the sixth aspect.

BRIEF DESCRIPTION OF DRAWINGS

FIG. 17 is a schematic flowchart of another method for obtaining a reference sequence according to an embodiment of this application;

FIG. 18 is a schematic flowchart of another method for obtaining a reference sequence according to an embodiment of this application;

FIG. 19 is a schematic flowchart of another method for obtaining a reference signal according to an embodiment of this application;

DESCRIPTION OF EMBODIMENTS

Figure 1:
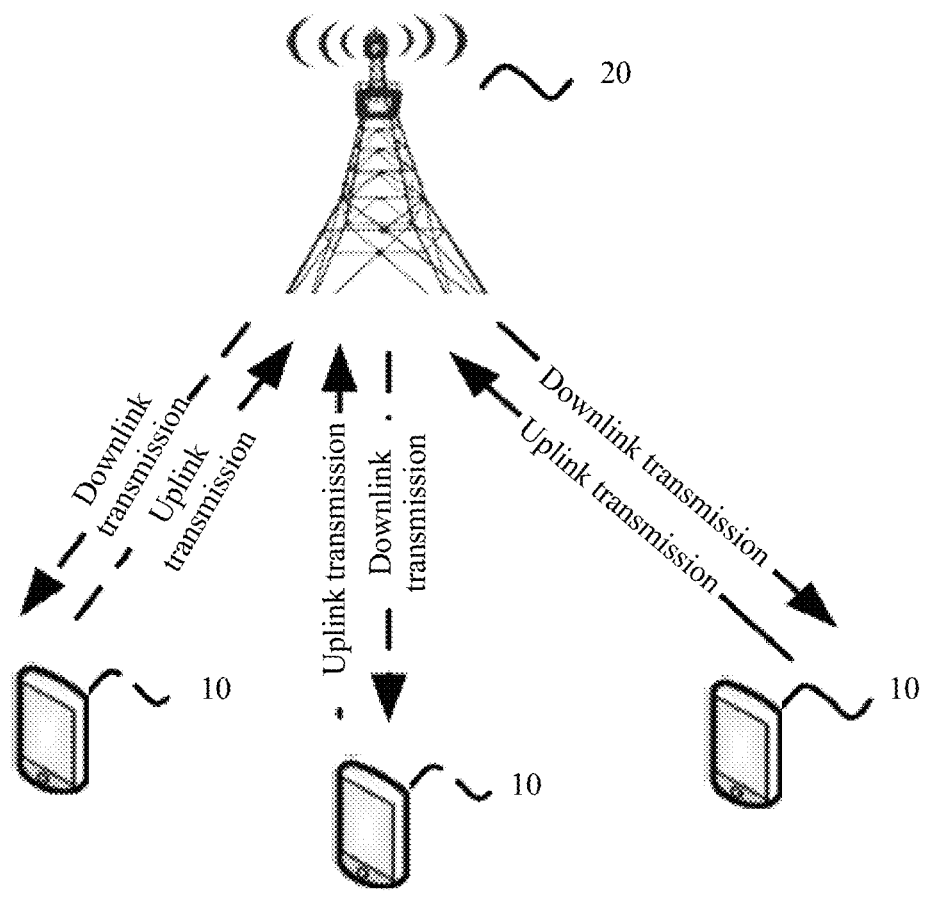
FIG. 1 is a schematic diagram of an architecture of a communications network according to an embodiment of this application.

To make the objectives, technical solutions, and advantages of this application clearer, the following describes the technical solutions of the embodiments of this application in more detail with reference to embodiments and accompanying drawings.

The technical solutions according to embodiments of this application are clearly described in the following with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of this application.

Network architectures and application scenarios described in the embodiments of this application are intended to describe the technical solutions of the embodiments of this application more clearly, and do not constitute any limitation to the technical solutions provided by the embodiments of this application. A person of ordinary skill in the art may know that, with evolution of the network architectures and emergence of new service scenarios, the technical solutions provided by the embodiments of this application are also applicable to similar technical problems.

The technical solutions of this application may be applied to various communications systems that are based on non-orthogonal multiple access technologies, for example, a sparse code multiple access (SCMA) system, and a low density signature (LDS) system. Certainly, the SCMA system and the LDS system may also be referred to as other names. Further, the technical solutions of the embodiments of this application may be applied to a multicarrier transmission system using a non-orthogonal multiple access technology, for example, a system using a non-orthogonal multiple access technology, orthogonal frequency division multiplexing (OFDM), filter bank multicarrier (FBMC), generalized frequency division multiplexing (GFDM), or filtered orthogonal frequency division multiplexing (F-OFDM).

A terminal device in this application may be an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like. This is not limited in the embodiments of this application.

A network device in this application may be a device for communicating with a terminal device. The network device may be a base transceiver station (BTS) in a global system for mobile communications (GSM) system or a code division multiple access (CDMA) system, or may be a NodeB (NodeB, NB) in a wideband code division multiple access (WCDMA) system, or may be an evolved NodeB (evolved NodeB, eNB or eNodeB) in an LTE system, or may be a radio controller in a cloud radio access network (CRAN) scenario; or the network device may be a relay station, an access point, an in-vehicle device, a wearable device, a network device in a future 5G network, a network device in a future evolved PLMN network, or the like. This is not limited in the embodiments of this application.

Referring to FIG. 1, FIG. 1 is a schematic diagram of an architecture of a communications network according to an embodiment of this application. As shown in FIG. 1, the communications system may include a terminal device 10 and a network device 20. The network device 20 is configured to provide a communications service for the terminal device 10 and access a core network. The terminal device 10 accesses the network by detecting a synchronization signal or a broadcast signal or the like sent by the network device 20, so as to communicate with the network device. Arrows shown in FIG. 1 may indicate uplink transmission and/or downlink transmission performed by using radio links between the terminal device 10 and the network device 20. For ease of description, only one terminal device is used as an example for description in FIG. 1. However, the network architecture includes but is not limited to one terminal device.

In this application, the term "symbol" includes but is not limited to an orthogonal frequency division multiplexing (OFDM) symbol, a sparse code multiple access technology (SCMA) symbol, a filtered orthogonal frequency division multiplexing (F-OFDM) symbol, or a non-orthogonal multiple access (NOMA) symbol, which may be determined according to an actual situation. Details are not described herein.

In this application, the term "subframe" is a time-frequency resource occupying a whole system bandwidth in frequency domain or a time-frequency resource element of fixed duration in time domain, for example, 1 millisecond.

In this application, the term "timeslot" is a basic time-frequency resource element, and occupies 7 or 14 consecutive OFDM symbols in time domain.

In this application, the term "subcarrier width" is a smallest granularity in frequency domain. For example, in the LTE network, a subcarrier width of a subcarrier is 15 kHz; in 5G, a subcarrier width may be 15 kHz, 30 kHz, or 60 kHz.

In this application, the term "physical resource block" is P consecutive subcarriers occupied in frequency domain, and resources occupied in time domain are Q consecutive OFDM symbols. P and Q are natural numbers that are greater than or equal to 1. For example, a physical resource block may occupy 12 consecutive subcarriers in frequency domain, and may occupy 7 consecutive OFDM symbols in time domain, where $P=12$, and $Q=7$; or $P=12$, and $Q=14$; or $P=12$, and $Q=1$.

Physical resource block number in this application: A physical resource block number corresponds to a frequency domain position of an actual physical resource block. For example, if the physical resource block number is n, a set of 12 corresponding consecutive subcarrier numbers in frequency domain is {n, n+1, n+2, n+3, n+5, n+6, n+7, n+8, n+9, n+10, n+11}. The physical resource block number may be a number of a physical resource block included in a system carrier bandwidth, or the physical resource block number is a number of a physical resource block in a subband within a system carrier bandwidth.

In this application, the term "resource element group" is P consecutive subcarriers occupied in frequency domain, and resources occupied in time domain are one consecutive OFDM symbol. P is a natural number that is greater than 1. For example, a resource element group may occupy 12 consecutive subcarriers in frequency domain. Specifically, $P=12$.

In this application, the term "control channel element" corresponds to a plurality of resource element groups, and a quantity of resource element groups corresponding to a control channel element is fixed, for example, 6.

In this application, the term "control channel resource set" is a time-frequency resource carrying a control channel, including one or more consecutive or discrete time-frequency resource blocks in time domain and/or frequency domain.

In this application, the term "position offset information" is indication information used to determine an offset of a physical channel relative to a reference point. Specifically, an offset of a time-frequency resource on which the physical channel is located, relative to the reference point may be obtained based on the position offset information, and a unit of the offset may be a quantity of physical resource blocks, a quantity of subcarriers, a quantity of REGs, or the like.

In this application, ordinal numbers such as "first", "second", "third", "fourth", "fifth", "sixth", "seventh", "eighth", and "ninth" are used for distinguishing a plurality of objects, instead of limiting a sequence, a time sequence, priorities, importance, or the like of the plurality of objects.

In this application, "a frequency domain reference point" may be a system carrier bandwidth boundary or a center frequency domain position (for example, a center frequency), for example, a smallest subcarrier within a system carrier bandwidth, a largest subcarrier within a system carrier bandwidth, or a center subcarrier within a system carrier bandwidth; or a frequency domain reference point may be a candidate position of a channel raster, where the candidate position of the channel raster corresponds to a subcarrier position of the channel raster within a system bandwidth, and the subcarrier position of the channel raster is a predefined position. For example, within the system carrier bandwidth, a subcarrier position of one channel raster is included at an interval of 300 kHz.

In this application, "a reference point of a broadcast channel" may be a center frequency domain position or a boundary of a resource on which the broadcast channel is located, for example, a smallest subcarrier of the resource on which the broadcast channel is located, a largest subcarrier of the resource on which the broadcast channel is located, or a center subcarrier of the resource on which the reference point of the broadcast channel is located.

In this application, "a relative position of a control channel resource set relative to a reference point of a broadcast channel or a frequency domain reference point" includes a position of a frequency domain boundary or a frequency domain center position of the control channel resource set relative to the reference point of the broadcast channel or the frequency domain reference point, where the frequency domain boundary includes a smallest subcarrier or a largest subcarrier in the control channel resource set.

"The relative position of a bandwidth relative to a reference point of a broadcast channel or a frequency domain reference point" includes a position of a frequency domain boundary or a frequency domain center position of the bandwidth relative to the reference point of the broadcast channel or the frequency domain reference point, where the frequency domain boundary includes a smallest subcarrier or a largest subcarrier in the control channel resource set.

Figure 2:
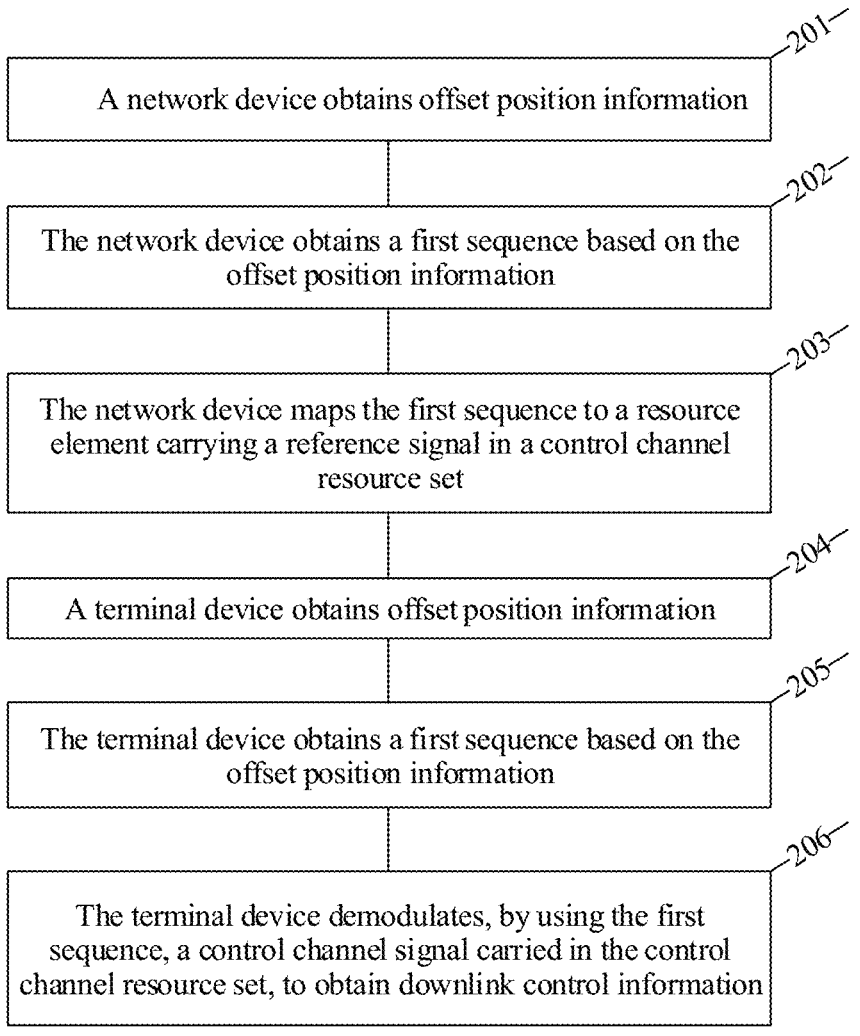
FIG. 2 is a schematic flowchart of a method for obtaining a reference signal according to an embodiment of this application.

FIG. 2 is a schematic flowchart of a method for obtaining a reference signal according to an embodiment of this application. As shown in FIG. 2, the method includes the following parts.

Part 201: A network device obtains position offset information.

Part 202: The network device obtains a first sequence based on the position offset information.

In an example, that the network device obtains a first sequence based on the position offset information includes: the network device obtains the first sequence based on the position offset information, or the network device generates the first sequence based on the position offset information.

In another example, the method further includes: the network device generates a reference signal sequence. It should be especially emphasized that no sequence exists between the generating a reference signal sequence and part 201. Specifically, the reference signal sequence may be generated first, and then the position offset information is obtained; or the position offset information is obtained first, and then the reference signal sequence is generated.

That the network device obtains a first sequence based on the position offset information includes: the network device obtains the first sequence from the reference signal sequence based on the position offset information, where the first sequence is a subset of the reference signal sequence, and the position offset information is a position of at least one value of the first sequence in the reference signal sequence.

In another example, that a network device obtains position offset information includes: the network device may determine the position offset information according to a position of a resource element for mapping the first sequence. The control channel resource set includes the resource element.

Part 203: The network device maps the first sequence to a resource element carrying a reference signal in a control channel resource set.

In an example, the network device sends a MIB to a terminal device, where the MIB includes indication information of a first relative position and indication information of a second relative position, the first relative position is a position of a reference point of a broadcast channel carrying the MIB, relative to a frequency domain reference point, the second relative position is a relative position of the control channel resource set relative to the reference point of the broadcast channel, and the indication information of the first relative position and the indication information of the second relative position are used to indicate the position offset information.

In another example, the network device sends a MIB to a terminal device, where the MIB includes indication information of a third relative position, the third relative position is a position of a reference point of a broadcast channel carrying the MIB, relative to a frequency domain reference point, the indication information of the third relative position is used with a fourth relative position to indicate the position offset information, the fourth relative position is a relative position of the control channel resource set relative to the reference point of the broadcast channel, and the fourth relative position is configured or preset.

In another example, the network device sends a master information block MIB to a terminal device, where the MIB includes indication information used to indicate eighth relative position information of the control channel resource set relative to a frequency domain reference point, and the indication information of the eighth relative position information is used to indicate the position offset information.

In another example, the network device sends configuration information of a bandwidth to a terminal device, where the configuration information includes indication information of a fifth relative position, the fifth relative position is a relative position of a system bandwidth subset of the control channel resource set relative to a frequency domain reference point, and the indication information of the fifth relative position is used to indicate the position offset information.

In another example, the network device sends configuration information of a bandwidth to a terminal device, where the configuration information includes indication information of a sixth relative position and indication information of a seventh relative position, the sixth relative position is a relative position of a bandwidth comprising the control channel resource set relative to a reference point frequency domain position of a broadcast channel carrying a MIB, the seventh relative position is a position of the reference point of the broadcast channel carrying the MIB, relative to a frequency domain reference point, and the indication information of the sixth relative position and the indication information of the seventh relative position are used to indicate the position offset information.

In another example, the network device sends configuration information of the control channel resource set to a terminal device, where the configuration information of the control channel resource set includes indication information used to indicate the position offset information. For example, the indication information used to indicate the position offset information includes indication information used to indicate a physical resource block number of the control channel resource set.

In another example, that a network device obtains position offset information includes: determining the position offset information according to a position of a resource element for mapping the first sequence, where the control channel resource set includes the resource element for mapping the first sequence.

In another example, a complex value modulation symbol corresponding to the first sequence is obtained according to the first sequence. The network device maps the complex value modulation symbol to a predefined control channel reference signal resource element, and sends the control channel.

Part 204: A terminal device obtains position offset information.

In an example, the terminal device may obtain the position offset information in any one of the following manners:

Manner 1: The terminal device receives a master information block MIB sent by the network device, where the MIB includes indication information used to indicate a first relative position and indication information used to indicate a second relative position, the first relative position is a position of a reference point of a broadcast channel carrying the MIB, relative to a frequency domain reference point, and the second relative position is a relative position of the control channel resource set relative to the reference point of the broadcast channel; and that a terminal device obtains position offset information includes: the terminal device determines the position offset information according to the first relative position indicated by the indication information of the first relative position and the second relative position indicated by the indication information of the second relative position.

According to the solution provided in the manner 1, when reference points of a plurality of broadcast channels are sent in different frequency domain positions, reference signals used by control channel resources configured for reference points of different broadcast channels are selected from a same sequence. In addition, even if a plurality of control channel resources overlap each other, a same first sequences is used in an overlapping region, and further, resource reuse by a plurality of users, for example, orthogonal MU-MIMO, can be implemented in the overlapping resource region. In addition, the MIB includes the position offset information of the control channel resources. This is advantageous to forward compatibility, and can flexibly avoid interference from a signal sent by a neighboring cell on the control channel resources.

Figure 3:
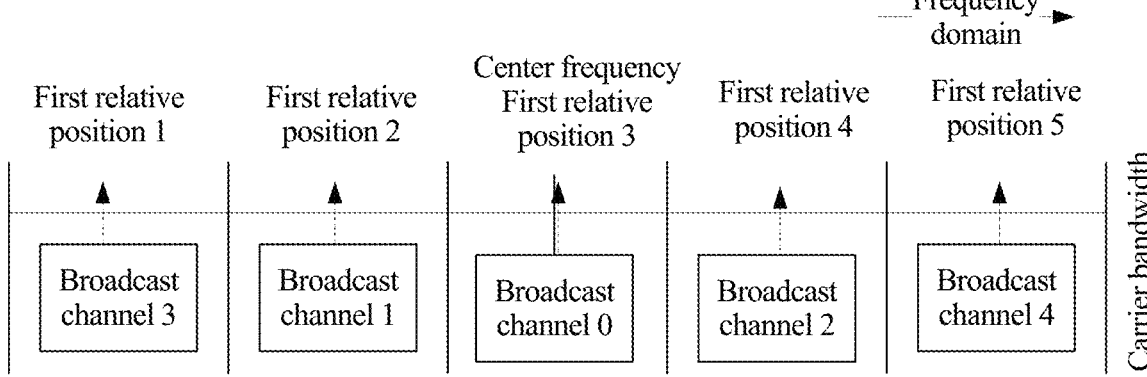
FIG. 3 is a schematic diagram of a correspondence between a first relative position and a reference point of a broadcast channel in a manner 1 according to an embodiment of this application.

FIG. 3 is a schematic diagram of a correspondence between a first relative position and a reference point of a broadcast channel in the manner 1. As shown in FIG. 3, a reference point of each broadcast channel corresponds to a first relative position.

For example, the first relative position may be an offset of a quantity of physical resource blocks, of the reference point of the broadcast channel relative to the frequency domain reference point. In this embodiment, only the quantity of offset physical resource blocks is used as an example for indicating the offset. An actual offset may be predefined as other resource units, and is not limited herein.

In the manner 1, the terminal device receives the master signal block MIB sent by the network device, where the MIB includes the indication information used to indicate the first relative position of the reference point of the broadcast channel carrying the MIB, relative to the frequency domain reference point. For example, for a value of the first relative position, refer to Table 1. For example, indication information of a reference point 2 of a broadcast channel is 001, and a first relative position 2 is $+N^{Offset}_{RB}$.

TABLE 1

| Reference point of a broadcast channel | Indication information | First relative position |
|---|---|---|
| 0 | 000 | 0 |
| 2 | 001 | $+N^{Offset}_{RB}$ |
| 4 | 010 | $+2N^{Offset}_{RB}$ |
| 1 | 011 | $-N^{Offset}_{RB}$ |
| 3 | 100 | $-2N^{Offset}_{RB}$ |

For example, indication information of a reference point 1 of a broadcast channel included in the MIB is {011}, and it may be determined, according to a correspondence between the reference point of the broadcast channel, the indication information, and the first relative position, that a first relative position 2 corresponding to the reference point 1 of the broadcast channel is $\{-N^{Offset}_{RB}\}$. Similarly, indication information of a reference point 2 of a broadcast channel is {001}, and a first relative position 4 is $\{+N^{Offset}_{RB}\}$; indication information corresponding to a reference point 3 of a broadcast channel is {100}, and a first relative position 1 is $\{-2N^{Offset}_{RB}\}$; indication information corresponding to a reference point 4 of a broadcast channel is {010}, and a first relative position 5 is $\{+2N^{Offset}_{RB}\}$; indication information corresponding to a reference point 0 of a broadcast channel is {100}, and a first relative position 3 is {0}.

For example, the correspondence between the reference point of the broadcast channel, the indication information, and the first relative position may be predefined by the network device and the terminal device, or may be specified by a protocol, or may be preconfigured. This is not specifically limited in this application, and shall fall within the protection scope of this application as long as the correspondence between the reference point of the broadcast channel, the indication information, and the first relative position can be reflected.

Figure 4:
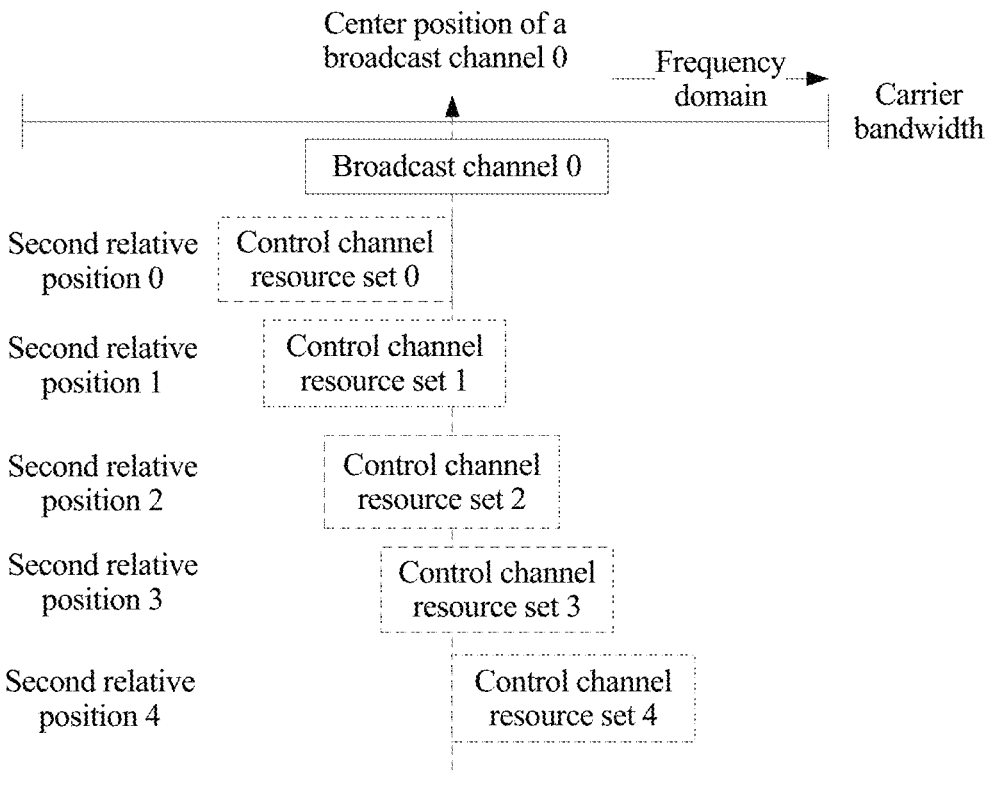
FIG. 4 is a schematic diagram of a correspondence between a second relative position and a control channel resource set in a manner 1 according to an embodiment of this application.

For example, the MIB sent by the network device and received by the terminal device further includes the indication information used to indicate the second relative position of the control channel resource set relative to the reference point of the broadcast channel. FIG. 4 is a schematic diagram of a correspondence between a control channel resource set and a second relative position in the manner 1. As shown in FIG. 4, a center subcarrier of a reference point 0 of a broadcast channel is located on a center frequency, and the second relative position is a relative position of the control channel resource set relative to the reference point 0 of the broadcast channel.

As shown in Table 2, indication information corresponding to the control channel resource set 0 included in the MIB is 000, and a second relative position is $-2N^{CORESET\_offset}_{RB}$. Indication information corresponding to a control channel resource set 1 included in the MIB is 001, and a second relative position is $-2N^{CORESET\_offset}_{RB}$. Based on a correspondence between the reference point of the broadcast channel, the indication information, and the second relative position, a resource position offset of the control channel resource set relative to a center position of the reference point of the broadcast channel may be determined according to the indication information.

TABLE 2

| Control channel resource set | Indication information | Second relative position |
|---|---|---|
| 0 | 000 | $-2N^{CORESET\_offset}_{RB}$ |
| 1 | 001 | $-N^{CORESET\_offset}_{RB}$ |
| 2 | 010 | 0 |
| 3 | 011 | $+N^{CORESET\_offset}_{RB}$ |
| 4 | 100 | $+2N^{CORESET\_offset}_{RB}$ |

Figure 5:
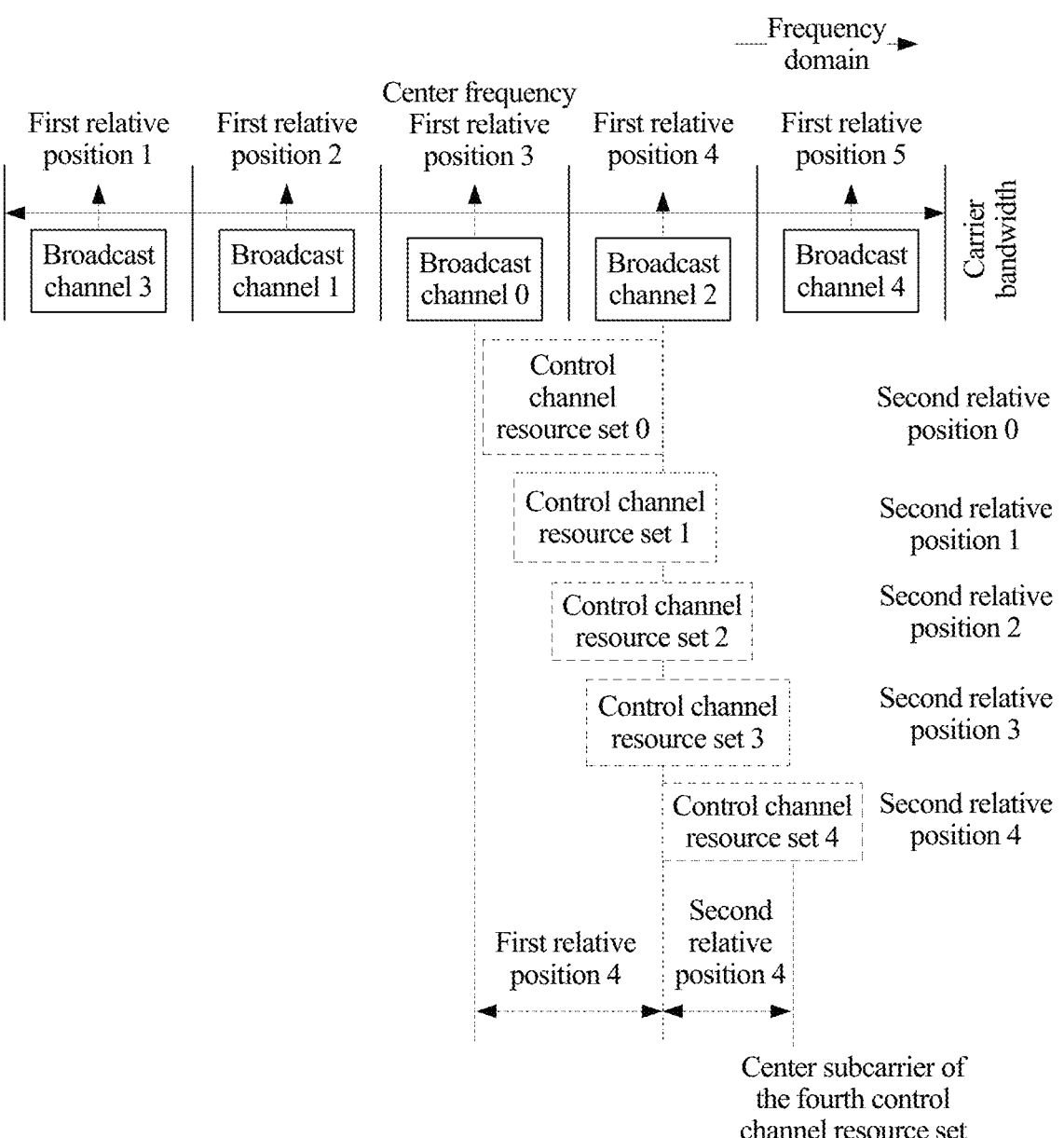
FIG. 5 is a schematic diagram of a correspondence between a first relative position and a second relative position in a manner 1 according to an embodiment of this application.

FIG. 5 is a schematic diagram of a correspondence between a first relative position and a second relative position in the manner 1. As shown in FIG. 5, position offset information of a control channel resource set 4 is determined according to a first relative position 4 and a second relative position 4, where the first relative position 4 is $+N^{Offset}_{RB}$, and the second relative position 4 is $+2N^{CORESET\_offset}_{RB}$. Therefore, an offset position of the control channel resource set 4 is $N^{Offset}_{RB}+2N^{CORESET\_offset}_{RB}$.

It should be especially emphasized that the position offset information may be obtained according to the first relative position and the second relative position by using any one of the following methods: for example, performing one or more of summation, deduction, multiplication, or division processing on the first relative position and the second relative position to determine the position offset information.

Further, the terminal device obtains a first sequence based on the offset position ($N^{Offset}_{RB}+2N^{CORESET\_offset}_{RB}$).

For example, that the terminal device obtains a first sequence based on the position offset information includes:

A. The terminal device may generate a reference signal sequence by using a formula $$r(m) = \frac{1}{\sqrt{2}}(1 - 2 \cdot c(2m)) + j\frac{1}{\sqrt{2}}(1 - 2 \cdot c(2m + 1)), \qquad (1)$$

$$m = 0, 1, \dots, n^{RB}_{RE} \cdot N^{max,DL}_{RB} - 1$$

where $N^{max,DL}_{RB}$ indicates a maximum quantity of a physical resource blocks included in a system carrier bandwidth, and $n^{RB}_{RE}$ is a quantity of resource elements included in each physical resource block and used for mapping a reference signal.

B. The terminal device obtains the first sequence from the reference signal sequence r based on the position offset information.

For example, according to a length $N_{RS}$ of the first sequence in the offset position, a value range of the first sequence is k=0, 1, 2, . . . , $N_{RS}$−1, and the obtained first sequence may be r (k+offset position), where an offset indicated by the offset position is $N^{Offset}_{RB}+2N^{CORESET\_offset}_{RB}$. To be specific, the position offset information=$N^{Offset}_{RB}+2N^{CORESET\_offset}_{RB}$.

For example, the correspondence between the reference point of the broadcast channel, the indication information, and the first relative position or the second relative position may be predefined by the network device and the terminal device, or may be specified by a protocol, or may be preconfigured. This is not specifically limited in this application, and shall fall within the protection scope of this application as long as the correspondence between the reference point of the broadcast channel, the indication information, and the first relative position can be reflected.

Manner 2: The terminal device receives a master signal block MIB sent by the network device, where the MIB includes indication information used to indicate a third relative position, and the third relative position is a position of a reference point of a broadcast channel carrying the MIB, relative to a frequency domain reference point; and that a terminal device obtains position offset information includes: the terminal device determines the position offset information according to the third relative position indicated by the indication information of the third relative position and a fourth relative position, where the fourth relative position is a relative position of the control channel resource set relative to the reference point of the broadcast channel, and the fourth relative position is configured or preset.

According to the solution in the manner 2, when reference points of a plurality of broadcast channels are sent in different frequency domain positions, reference signals used by control channel resources configured for reference points of different broadcast channels are selected from a same sequence. In addition, even if a plurality of control channel resources overlap each other, a same first sequences is used in an overlapping region, and further, resource reuse by a plurality of users, for example, orthogonal MU-MIMO, can be implemented in the overlapping resource region.

It should be especially noted that, for a manner of indicating the third relative position in the manner 2, refer to the manner of indicating the first relative position in the manner 1. Details are not described again herein.

It should be especially emphasized that the position offset information may be obtained according to the third relative position and the fourth relative position by using any one of the following methods: for example, performing one or more of summation, deduction, multiplication, or division processing on the third relative position and the fourth relative position to determine the position offset information.

Figure 6:
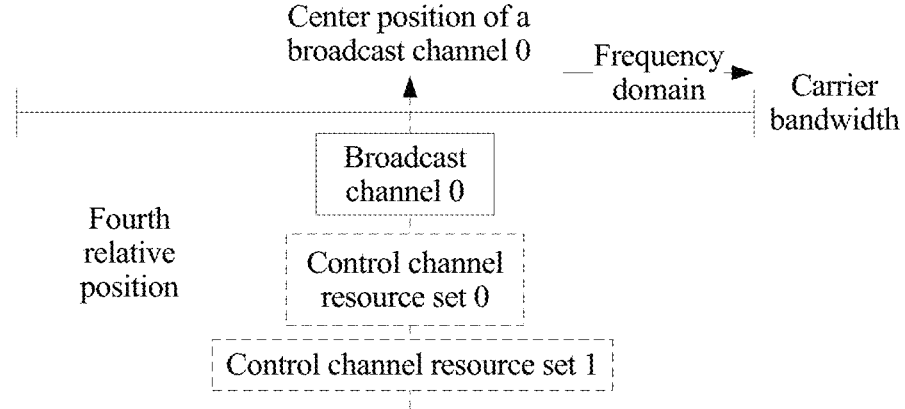
FIG. 6 is a schematic diagram of a correspondence between a control channel resource set and a fourth relative position in a manner 2 according to an embodiment of this application.

FIG. 6 is a schematic diagram of a correspondence between a control channel resource set and a fourth relative position in the manner 2. As shown in FIG. 6, the fourth relative position is a relative position of the control channel resource set relative to a reference point 0 of a broadcast channel. For example, a position of a center subcarrier of a resource of the control channel resource set is the same as that of a center subcarrier of the reference point of the broadcast channel. In addition, the fourth relative position is configured or preset.

It should be especially noted that the position of the control channel resource set relative to the reference point of the broadcast channel is fixed in the manner 2, but whether a size of a time-frequency resource included in the control channel resource set is variable is not limited.

Figure 7:
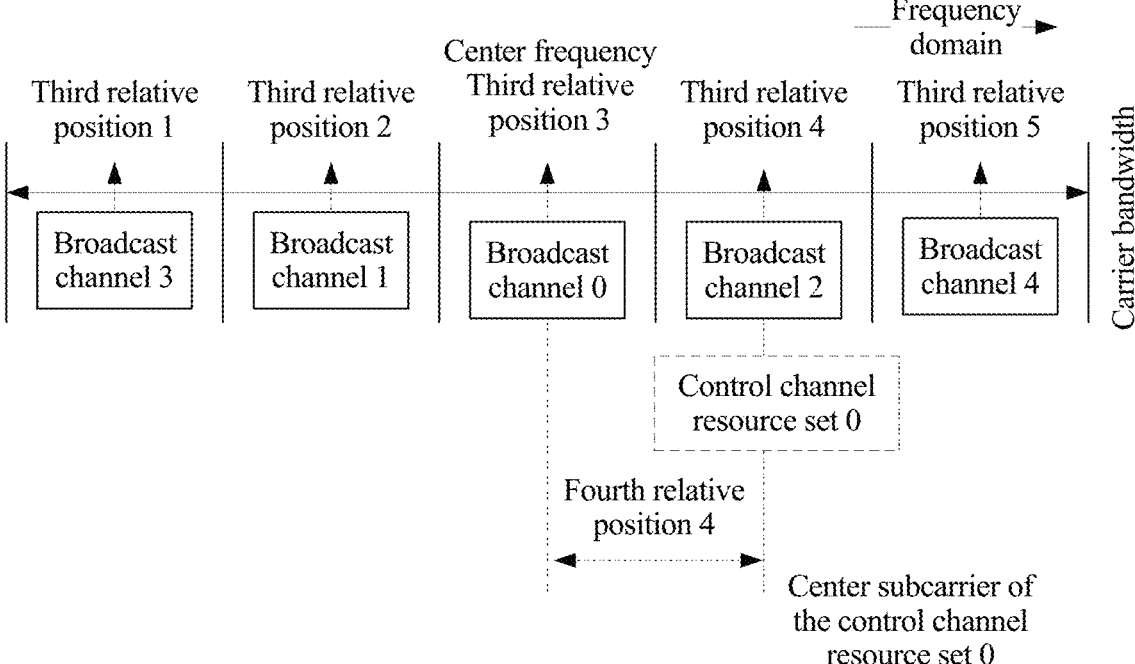
FIG. 7 is a schematic diagram for indicating a correspondence between a third relative position and a fourth relative position in a manner 2 according to an embodiment of this application.

FIG. 7 is a schematic diagram of a correspondence between a third relative position and a fourth relative position in the manner 2. As shown in FIG. 7, position offset information of the control channel resource set 4 is determined according to a third relative position 4 and a fourth relative position 4. Assuming that indication information included in the MIB is 001, according to Table 1 in the manner 1, it can be known that the third relative position 4 is $+N^{Offset}_{RB}$, and a resource position of the control channel resource set relative to the reference point of the broadcast channel is predefined and is 0, that is, the fourth relative position is predefined as a center position of the reference point of the broadcast channel. Therefore, position offset information of the control channel resource set 4 is $+N^{Offset}_{RB}$.

For a manner of obtaining the first sequence by the terminal device based on the position offset information ($+N^{Offset}_{RB}$), refer to a manner of obtaining the first sequence based on the position offset information in the manner 1. Details are not described again herein.

Manner 3: The terminal device receives a master information block MIB, where the MIB includes indication information used to indicate eighth relative position information of the control channel resource set relative to a frequency domain reference point; and that a terminal device obtains position offset information includes: the terminal device determines the position offset information according to the eighth relative position indicator by the indication information of the eighth relative position.

According to the solution provided in the manner 3, when reference points of a plurality of broadcast channels are sent in different frequency domain positions, reference signals used by control channel resources configured for reference points of different broadcast channels are selected from a same sequence. In addition, even if a plurality of control channel resources overlap each other, a same first sequences is used in an overlapping region, and further, resource reuse by a plurality of users, for example, orthogonal MU-MIMO, can be implemented in the overlapping resource region. In addition, a reference position of a control channel relative to a reference point of a broadcast channel and position information of the reference point of the broadcast channel relative to the frequency domain reference point can be jointly encoded. This improves coding efficiency and reduces indication signaling overheads.

For example, the terminal device receives the indication information of the eighth relative position. For example, the indication information is 011, as shown in Table 3, and the indication information 011 represents that an eighth relative position 4 of the control channel resource set 3 is $+N^{CORESET\_offset}_{RB}$.

TABLE 3

| Control channel resource set | Indication information | Eighth relative position |
|---|---|---|
| 0 | 000 | $-2N_{RB}^{CORESET\_offset}$ |
| 1 | 001 | $-N_{RB}^{CORESET\_offset}$ |
| 2 | 010 | 0 |
| 3 | 011 | $+N_{RB}^{CORESET\_offset}$ |
| 4 | 100 | $+2N_{RB}^{CORESET\_offset}$ |

Figure 8:
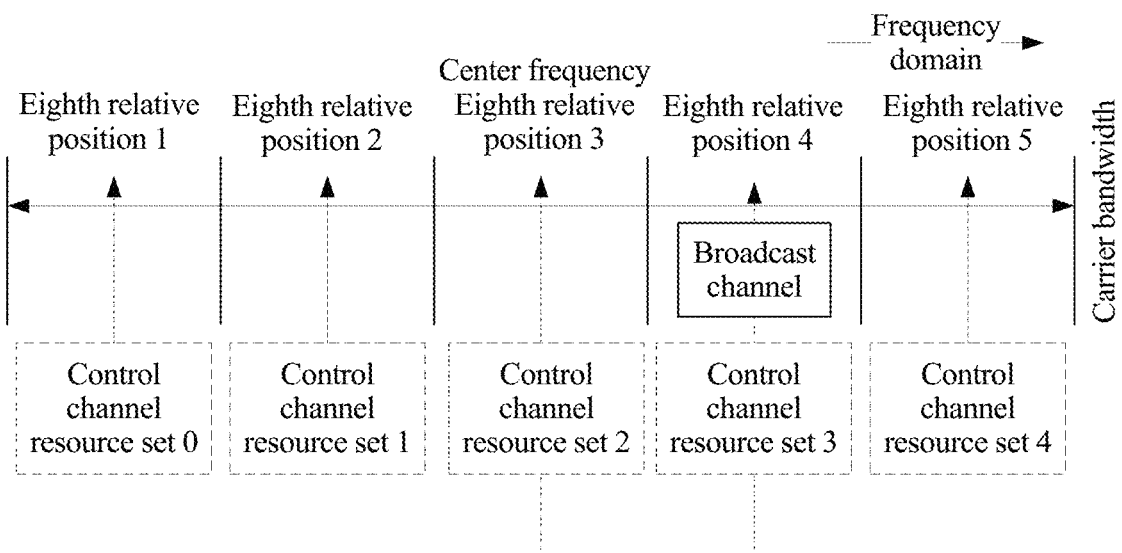
FIG. 8 is a schematic diagram of a correspondence between an offset position 4 and a control channel resource set in a manner 3 according to an embodiment of this application.

FIG. 8 is a schematic a correspondence between an eighth relative position 4 and a control channel resource set in the manner 3. As shown in FIG. 8, according to Table 4, it can be known that an eighth relative position corresponding to a control channel resource set 3 is $+N^{CORESET\_offset}_{RB}$.

The terminal device determines, according to the eighth relative position, that the position offset information is $(+N^{CORESET\_offset}_{RB})$. For a manner of obtaining the first sequence based on the position offset information, refer to the manner of obtaining the first sequence based on the position offset information in the manner 1. Details are not described again herein.

For example, the correspondence between the control channel resource set, the indication information, and the eighth relative position may be predefined by the network device and the terminal device, or may be specified by a protocol, or may be preconfigured. This is not specifically limited in this application, and shall fall within the protection scope of this application as long as the correspondence between the control channel resource set, the indication information, and the eighth relative position can be reflected.

Manner 4: The terminal device receives configuration information of a bandwidth part, where the configuration information includes indication information of a fifth relative position, and the fifth relative position is a relative position of a bandwidth part comprising the control channel resource set relative to a frequency domain reference point; and that a terminal device obtains position offset information includes: the terminal device determines the position offset information according to the fifth relative position indicated by the indication information of the fifth relative position.

According to the solution provided in the manner 4, the configuration information of the bandwidth part may be carried in remaining minimum system information (RMSI) other than a MIB. Therefore, indication signaling overheads of the MIB are reduced. In addition, the RMSI may carry more bit information, and further, an offset of a bandwidth part in frequency domain may be more flexible, that is, an offset granularity in frequency domain may be smaller. Therefore, the offset of the bandwidth part is more flexible, and resource utilization can be improved.

For example, the network device sends higher layer signaling to the terminal device, where the higher layer signaling includes configuration information of a system bandwidth, and the higher layer signaling includes at least one of RRC signaling, system information, RMSI, or the like.

Figure 9:
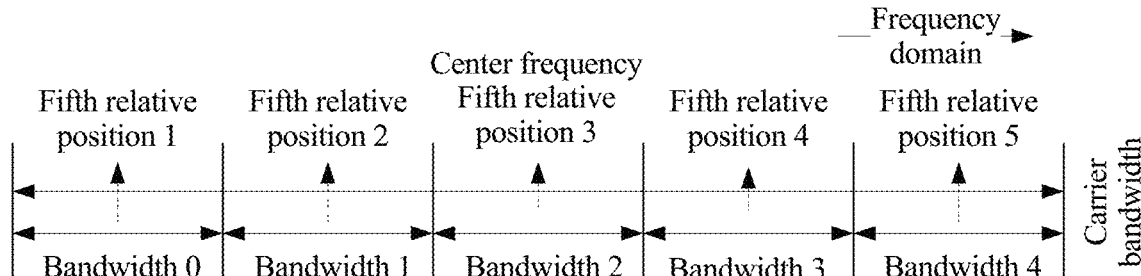
FIG. 9 is a schematic diagram of a correspondence between a bandwidth and a fifth relative position in a manner 4 according to an embodiment of this application.

An offset of a center frequency of the bandwidth part relative to a center frequency may include at least one of the following:

For example, the higher layer signaling may explicitly indicate, that the fifth relative position may be at least one value in a value set. As shown in FIG. 9, the value set may be predefined. For example, the value set may be $\{-2N^{Offset\_BP}_{RB}, -N^{Offset\_BP}_{RB}, 0, +N^{Offset\_BP}_{RB}, +2N^{Offset\_BP}_{RB}\}$. As shown in FIG. 9, a fifth relative position 1 of a bandwidth 0 is $2N^{Offset\_BP}_{RB}$; a fifth relative position 2 of a bandwidth 1 is $-N^{Offset\_BP}_{RB}$; a fifth relative position 4 of a bandwidth 2 is 0; a fifth relative position 3 of a bandwidth 3 is $+N^{Offset\_BP}_{RB}$; and a fifth relative position 2 of a bandwidth 5 is $+2N^{Offset\_BP}_{RB}$.

It should be especially noted that, at least one value in the predefined value set corresponds to the control channel resource set included in a system bandwidth. The predefined value set may be predefined, or may be specified by a protocol, or may be preconfigured. This is not specifically limited in this application.

For another example, the higher layer signaling sent by the network device to the terminal device includes the bandwidth configuration information including a quantity of bandwidths, where a size of a frequency domain resource occupied by each subband is equal. The higher layer signaling includes system information, RMSI (Remaining minimum system information), RRC signaling, or the like.

For another example, as shown in Table 4, the terminal device may determine the fifth relative position information based on the quantity of bandwidths and a number of a bandwidth subset.

TABLE 4

| Bandwidth | Indication information | Fifth relative position |
|---|---|---|
| 0 | 0 | $-N_{RB}^{CORESET\_offset}/4$ |
| 1 | 1 | $+N_{RB}^{CORESET\_offset}/4$ |

Figure 10:
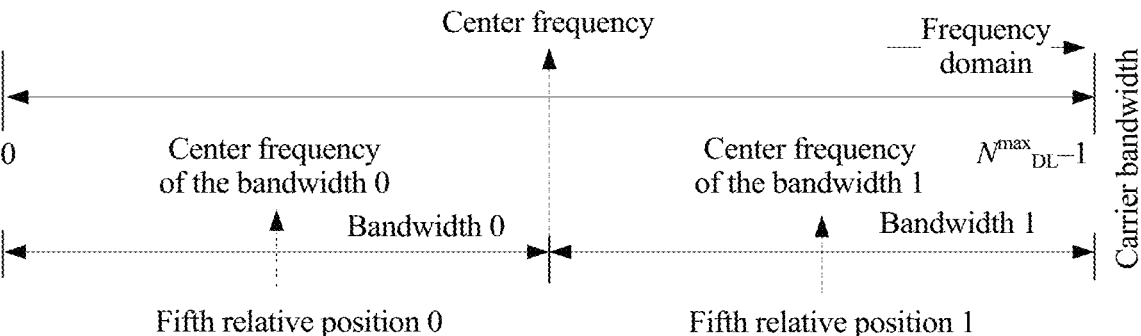
FIG. 10 is a schematic diagram of another correspondence between a bandwidth and a fifth relative position in a manner 4 according to an embodiment of this application.

As shown in FIG. 10, the system carrier bandwidth includes two subsets: a bandwidth 0 and a bandwidth 1, configured by using the higher layer signaling. A maximum quantity of physical resource blocks included in a downlink system carrier bandwidth in frequency domain is $N^{max}_{DL}$, or a quantity of physical resource blocks within a bandwidth included in a downlink system carrier bandwidth is $N^{max\_BP}_{DL}$, where a value of $N^{max\_BP}_{DL}$ or $N^{max}_{DL}$ is a value predefined by the system. A value of the fifth relative position may be determined based on the quantity of included bandwidths. For example, if the quantity of bandwidths is 2, the fifth relative position is $\{-N^{max}_{DL}/4, +N^{max}_{DL}/4\}$. In this case, it indicates that the fifth relative position corresponding to the bandwidth 0 of the control channel resource set is $-N^{max}_{DL}/4$, or $+N^{max}_{DL}/4$.

Figure 11:
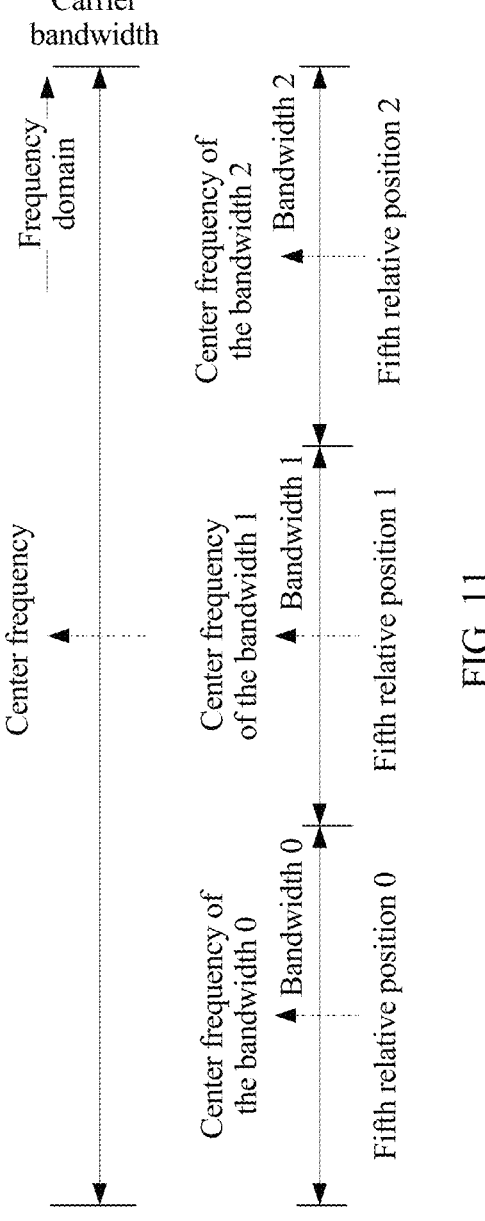
FIG. 11 is a schematic diagram of another correspondence between a bandwidth and a fifth relative position in a manner 4 according to an embodiment of this application.

As shown in FIG. 11, the system carrier bandwidth includes three bandwidths: a bandwidth 0, a bandwidth 1, and a bandwidth 2, configured by using the higher layer signaling, as shown in Table 5.

TABLE 5

| Bandwidth | Indication information | Fifth relative position |
|---|---|---|
| 0 | 0 | $-N_{DL}^{max}/3$ |
| 1 | 1 | 0 |
| 2 | 2 | $+N_{DL}^{max}/3$ |

A maximum quantity of physical resource blocks included in a downlink system carrier bandwidth in frequency domain is $N^{max}_{DL}$. In this case, it may be determined, based on the quantity of included bandwidths, that a value of the fifth relative position is $\{-N^{max}_{DL}/3, 0, +N^{max}_{DL}/3\}$. If it is indicated that the control channel resource set is within the bandwidth 0, a fifth relative position 0 is $-N^{max}_{DL}/3$, but a fifth relative position 1 is 0, and a fifth relative position 2 is $+N^{max}_{DL}/3$.

For example, the correspondence between the bandwidth, the indication information, and the fifth relative position may be predefined by the network device and the terminal device, or may be specified by a protocol, or may be preconfigured. This is not specifically limited in this application, and shall fall within the protection scope of this application as long as the correspondence between the bandwidth, the indication information, and the fifth relative position can be reflected.

For example, the bandwidth configuration method further includes a method similar to a resource allocation type 2 Type2 in the LTE network. Details are not described herein.

For example, the control channel resource set is within the bandwidth. Position information of the control channel resource set relative to a center or boundary of the bandwidth is determined by the configuration information included in the higher layer signaling, and the higher layer signaling includes RRC signaling or RAR signaling, or the like.

For example, a position of the bandwidth comprising the control channel resource set may be marked as an offset position 0, as shown in Table 6.

TABLE 6

| Control channel resource set | Indication information | Offset position 0 |
|---|---|---|
| 0 | 000 | $-2N_{RB}^{CORESET\_offset}$ |
| 1 | 001 | $-N_{RB}^{CORESET\_offset}$ |
| 2 | 010 | 0 |
| 3 | 011 | $+N_{RB}^{CORESET\_offset}$ |
| 4 | 100 | $+2N_{RB}^{CORESET\_offset}$ |

Figure 12:
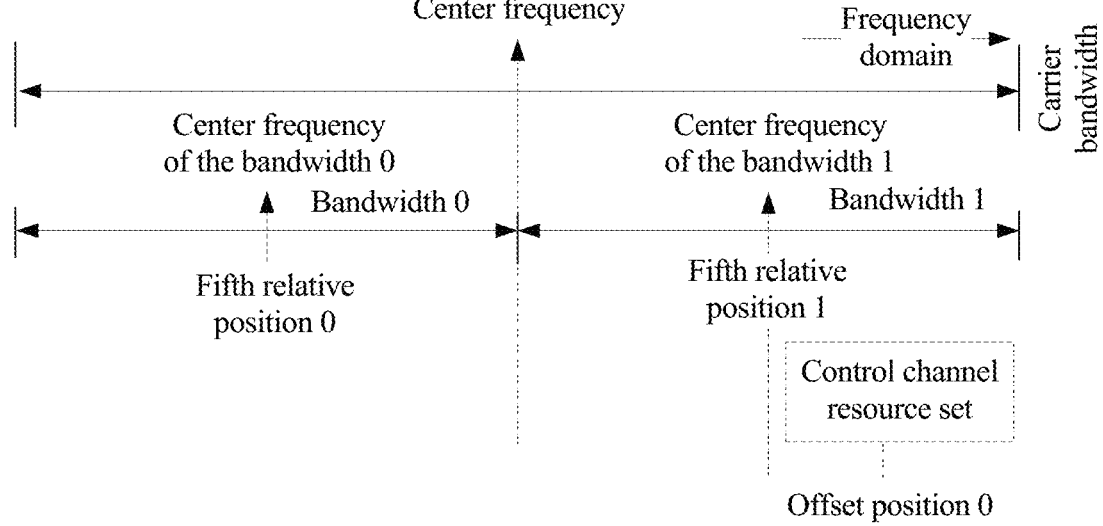
FIG. 12 is a schematic diagram of another correspondence between a bandwidth and a fifth relative position in a manner 4 according to an embodiment of this application.

As shown in FIG. 12, the terminal device determines the offset position according to the fifth relative position and the offset position 0.

For example, the control channel resource set is within the bandwidth. The offset position 0 of the control channel resource set relative to the center or boundary of the bandwidth is determined by the configuration information included in the higher layer signaling, and the higher layer signaling includes RRC signaling or RAR signaling, or the like.

For a manner of obtaining the first sequence by the terminal device based on the position offset information, refer to a manner of obtaining the first sequence based on the position offset information in the manner 1. Details are not described again herein.

For example, the correspondence between the control channel resource set, the indication information, and the offset position 0 may be predefined by the network device and the terminal device, or may be specified by a protocol, or may be preconfigured. This is not specifically limited in this application, and shall fall within the protection scope of this application as long as the correspondence between the control channel resource set, the indication information, and the offset position 0 can be reflected.

Manner 5: The terminal device receives configuration information of a bandwidth, where the configuration information includes indication information of a sixth relative position and indication information of a seventh relative position, the sixth relative position is a relative position of a bandwidth comprising the control channel resource set relative to a reference point of a broadcast channel carrying a MIB, and the seventh relative position is a position of the reference point of the broadcast channel carrying the MIB, relative to a frequency domain reference point; and that a terminal device obtains position offset information includes: determining the position offset information according to the sixth relative position indicated by the indication information of the sixth relative position and the seventh relative position indicated by the indication information of the seventh relative position.

It should be especially emphasized that the position offset information may be obtained according to the sixth relative position and the seventh relative position by using any one of the following methods: for example, performing one or more of summation, deduction, multiplication, or division processing on the sixth relative position and the seventh relative position to determine the position offset information.

According to the solution provided in the manner 5, the configuration information of the bandwidth may be carried in RMSI other than a MIB. Therefore, indication signaling overheads of the MIB are reduced. In addition, the RMSI may carry more bit information, and further, an offset of the bandwidth in frequency domain may be more flexible, that is, an offset granularity in frequency domain may be smaller. Therefore, the offset of the bandwidth is more flexible, and resource utilization can be improved.

An implementation of the sixth relative position in the manner 5 may be: predefining a value set $\{-2N^{Offset\_BP}_{RB}, -N^{Offset\_BP}_{RB}, 0, +N^{Offset\_BP}_{RB}, +2N^{Offset\_BP}_{RB}\}$ of the sixth relative position, and configuring a value of the sixth relative position corresponding to the bandwidth.

An implementation of the seventh relative position in the manner 5 may be: as shown in Table 7, indication information corresponding to a reference point 0 of a broadcast channel is 000, and a seventh relative position 1 is 0; indication information corresponding to a reference point 2 of a broadcast channel is 001, and a seventh relative position 2 is $+N^{Offset}_{RB}$.

TABLE 7

| Reference point of a broadcast channel | Indication information | Seventh relative position |
|---|---|---|
| 0 | 000 | 0 |
| 2 | 001 | $+N_{RB}^{Offset}$ |
| 4 | 010 | $+2N_{RB}^{Offset}$ |
| 1 | 011 | $-N_{RB}^{Offset}$ |
| 3 | 100 | $-2N_{RB}^{Offset}$ |

A value of the seventh relative position in Table 7 indicates an offset of a quantity of units of physical resource blocks, of the reference point of the broadcast channel relative to the frequency domain reference point. It is noted that in this embodiment, only the quantity of offset physical resource blocks is used as an example for indicating a value of the predefined offset. An actually predefined offset may be predefined as other resource units, and is not limited herein.

Figure 13:
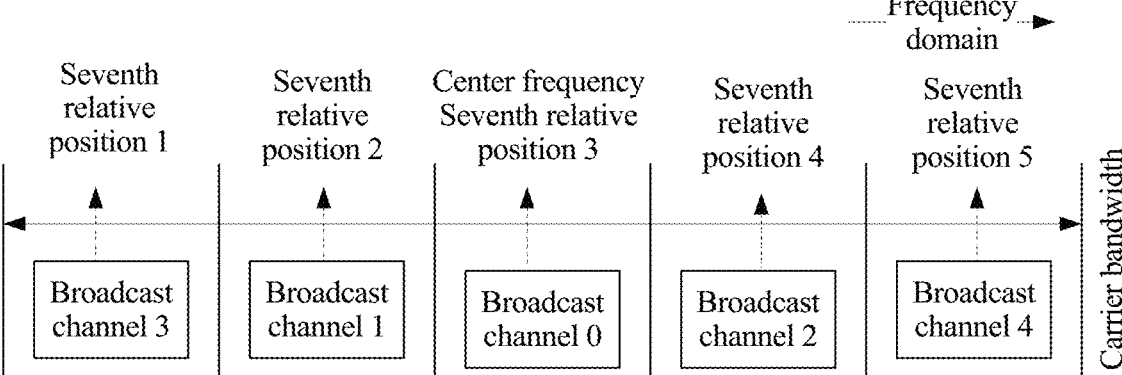
FIG. 13 is a schematic diagram of a correspondence between a reference point of a broadcast channel and a seventh relative position in a manner 5 according to an embodiment of this application.

As shown in FIG. 13, indication information of a reference point 1 of a broadcast channel is {011}, and a seventh relative position 2 is $\{-N^{Offset}{}_{RB}\}$; indication information of a reference point 2 of a broadcast channel is {001}, and a seventh relative position 4 is $\{+N^{Offset}{}_{RB}\}$; indication information corresponding to a reference point 3 of a broadcast channel is {100}, and a seventh relative position 1 is $\{-2N^{Offset}{}_{RB}\}$; indication information corresponding to a reference point 4 of a broadcast channel is {010}, and a seventh relative position 5 is $\{+2N^{Offset}{}_{RB}\}$; indication information corresponding to a reference point 0 of a broadcast channel is {000}, and a seventh relative position 3 is {0}.

Figure 14:
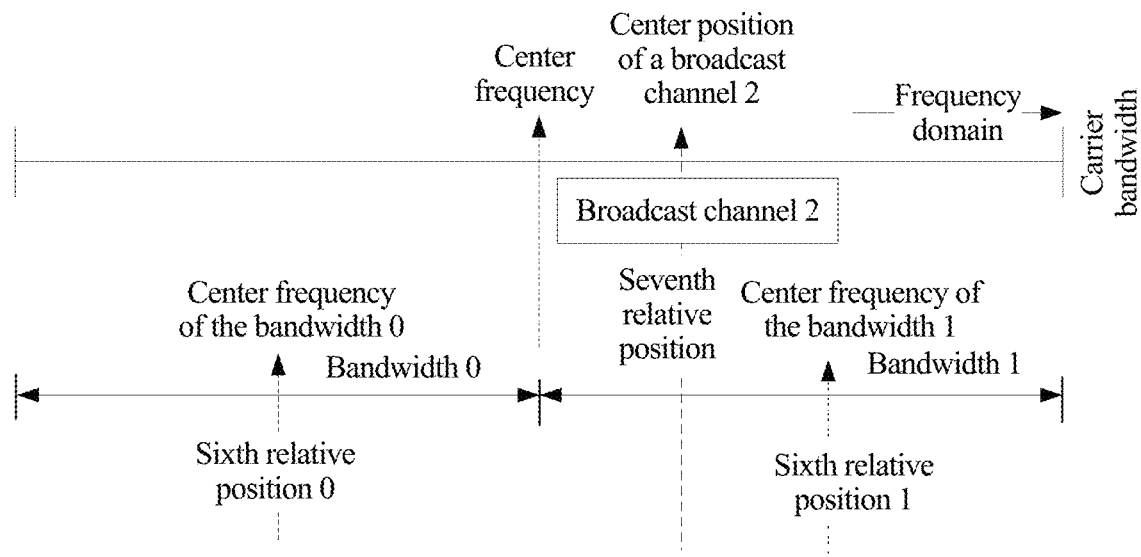
FIG. 14 is a schematic diagram of a correspondence between a sixth relative position and a seventh relative position in a manner 5 according to an embodiment of this application.

FIG. 14 is a schematic diagram of a correspondence between a sixth relative position and a seventh relative position. As shown in FIG. 14, a sixth relative position 0 is $-N^{Offset\_BP}{}_{RB}$, but a seventh relative position 5 is $+2N^{Offset\_BP}{}_{RB}$. In this case, the offset position is $(-N^{Offset\_BP}{}_{RB}+2N^{Offset\_BP}{}_{RB})$.

For a manner of obtaining the first sequence by the terminal device based on the position offset information, refer to a manner of obtaining the first sequence based on the position offset information in the manner 1. Details are not described again herein.

For example, the correspondence between the reference point of the broadcast channel, the indication information, and the seventh relative position may be predefined by the network device and the terminal device, or may be specified by a protocol, or may be preconfigured. This is not specifically limited in this application, and shall fall within the protection scope of this application as long as the correspondence between the reference point of the broadcast channel, the indication information, and the seventh relative position can be reflected.

Manner 6: the terminal device receives configuration information of the control channel resource set, where the configuration information of the control channel resource set includes indication information used to indicate the position offset information.

According to the solution provided in the manner 6, when configuring time-frequency resources of the control channel resource set, a network device obtains an overlapping resource region on the time-frequency resources, and determines the position offset information according to the overlapping resource region, and when configuring the control channel resource set, configures position offset information of a first sequence used by a control channel reference signal, so that reference signal sequences of a plurality of control channels are the same in the overlapping region. Therefore, orthogonal reuse by a plurality of users, that is, orthogonal MU-MIMO, is enabled. In addition, non-orthogonal interference between sequences that is caused by a plurality of different sequences on a same reference signal resource can be reduced.

For example, the indication information used to indicate the position offset information includes indication information used to indicate a physical resource block number of the control channel resource set; and the method further includes: the terminal device determines the position offset information according to a physical resource block indicated by the physical resource block number. According to this solution, all control channel resources use a same physical resource block number, and a reference point of the physical resource block number may be notified by a MIB or RMSI, and further, the terminal device obtains the unified physical resource block number in frequency domain according to a same frequency domain reference point. Therefore, first sequences determined for control channel resource sets including the same physical resource block number are the same, so that first sequences of control channel resource sets with overlapping resources are the same. Therefore, orthogonal reuse by a plurality of users, that is, orthogonal MU-MIMO, is enabled.

Figure 15:
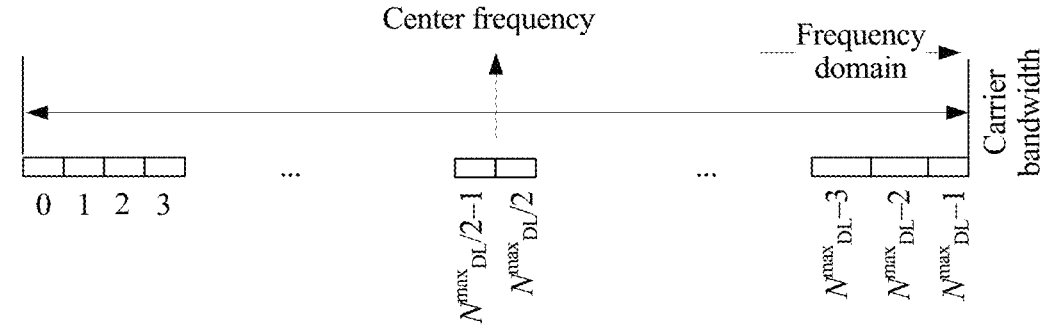
FIG. 15 is a schematic diagram of a correspondence between a control channel resource set and a physical resource block number in a manner 6 according to an embodiment of this application.
Figure 16:
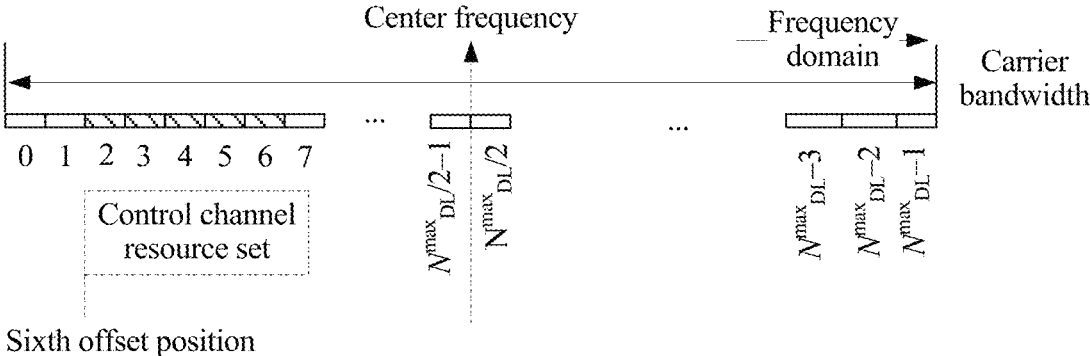
FIG. 16 is a schematic diagram of another correspondence between a control channel resource set and a physical resource block number in a manner 6 according to an embodiment of this application.

For example, the indication information of the physical resource block number may be a unified physical resource block number that exists within a whole system bandwidth. As shown in FIG. 15, because the center frequency is located in a resource block numbered 0, if physical resource block numbers corresponding to the control channel resource set are $\{n^{CORESET}, n^{CORESET}, \ldots, N^{CORESET}{}_{RB}-1\}$, where $N^{CORESET}{}_{RB}$ is a total quantity of physical resource blocks included in the control channel resource set, the position offset information may be determined by using $n^{CORESET}$. As shown in FIG. 16, $N^{CORESET}{}_{RB}=5$, and $n^{CORESET}=2$. In this case, a set of physical resource block numbers included in the control channel resource set is {2, 3, 4, 5, 6}, and the position offset information is 2.

It should be especially emphasized that using the quantity of physical resource blocks as an offset is merely an example in this embodiment of this application. This application includes but is not limited to this. Use of other equivalents shall fall within the protection scope of this application as long as the offset relative to the center frequency can be obtained.

If the frequency domain reference point is a boundary of a system carrier bandwidth, the physical resource block number of the frequency domain reference point is 0, and the offset position is $n^{CORESET}$.

For a manner of obtaining the first sequence by the terminal device based on the position offset information, refer to a manner of obtaining the first sequence based on the position offset information in the manner 1. Details are not described again herein.

In another example, the method for obtaining the first sequence based on the offset position further includes generating the first sequence based on the offset position.

In a possible implementation method, the obtained offset position is $n_{offset}$, and the first sequence may be generated by using a formula (2):

$$r(m) = \frac{1}{\sqrt{2}}(1 - 2 \cdot c(2m)) + j\frac{1}{\sqrt{2}}(1 - 2 \cdot c(2m + 1)), \qquad (2)$$

$$m = 0, 1, \ldots, n^{RB}_{RE} \cdot N^{CORESET}_{RB} - 1$$

In the formula (2), $N^{CORESET}{}_{RB}$ corresponds to a quantity of physical resource blocks occupied by the control channel resource set, where a quantity of resource elements included in each physical resource block and used for mapping a reference channel is $n^{RB}{}_{RE}$; and c(n) may be obtained by using a formula (3):

$$c(n) = (x_1(n + N_C) + x_2(n + N_C))\text{mod}2 \qquad (3)$$

$$x_1(n + 31) = (x_1(n + 3) + x_1(n))\text{mod}2$$

$$x_2(n + 31) = (x_2(n + 3) + x_2(n + 2) + x_2(n + 1) + x_2(n))\text{mod}2$$

In the formula (3), $N_C = 1600 + n_{offset}$.

The foregoing method is applicable not only to a control channel resource set including a single symbol but also to a control channel resource set of a plurality of symbols. Details are not described herein.

This embodiment ensures that when a plurality of control channel resource sets overlap each other on time-frequency resources, orthogonal code division multiplexing can be implemented for reference signals mapped on the overlapping time-frequency resources.

In another example, the terminal device generates a reference signal sequence. Step 205 in which the terminal device obtains a first sequence based on the offset position includes: the terminal device obtains the first sequence from the reference signal sequence based on the position offset information, where the first sequence is a subset of the reference signal sequence, and the offset position is a position of at least one value of the first sequence in the reference signal sequence.

For example, the reference signal sequence is a pseudo random aperiodic sequence, and the reference signal sequence may be generated according to a formula (4):

$$r(m) = \frac{1}{\sqrt{2}}(1 - 2 \cdot c(2m)) + j\frac{1}{\sqrt{2}}(1 - 2 \cdot c(2m + 1)), \quad (4)$$

$$\text{where } m = 0, 1, \ldots, 4N_{RB}^{max,DL} - 1$$

where $$N_{RB}^{max,DL}$$

is a maximum quantity of a physical resource blocks included in the system bandwidth. In this embodiment, the control channel resource set occupies one OFDM symbol in time domain, and each REG in the control channel resource set includes four resource elements used for mapping reference signals.

Part 205: The terminal device obtains a first sequence based on the position offset information.

Part 206: The terminal device demodulates, by using the first sequence, a control channel signal carried in the control channel resource set, to obtain downlink control information.

In an example, the terminal device may obtain the downlink control information in the following manner:

The terminal device detects a control channel in the control channel resource set, performs related processing on a received control channel reference signal by using the first sequence, estimates channel state information of a time-frequency resource on which the control channel is located, and demodulates and decodes the received control channel signal according to the channel state information to obtain the downlink control information.

It should be especially noted that, part 201 to part 203 in the embodiment shown in FIG. 2 may be used as an embodiment. Part 204 to part 206 may be used as another embodiment separately. In addition, a sequence of performing part 201 to part 206 in the embodiment shown in FIG. 2 may also be another sequence. This is not specifically limited in this application.

For example, on a basis of the foregoing manner 4, manner 5, and manner 6, the method may further include part 207: The terminal device receives a master information block MIB sent by the network device, where the MIB includes indication information used to indicate an eleventh relative position of the control channel resource set relative to a reference point of a broadcast channel carrying the MIB; and the terminal device obtains the second sequence from the reference signal sequence according to the eleventh relative position, where the second sequence is a subset of the reference signal sequence, and the eighth relative position is a position of at least one value of the second sequence in the reference signal sequence.

It should be especially noted that, part 207 may be used in combination with part 204 to part 206 in the embodiment shown in FIG. 2. This is not specifically limited in this application. A specific execution sequence may be determined flexibly. For example, part 207 may be performed first or may be performed before one of part 204 to part 206.

In the method, the MIB does not need to carry indication information of the frequency domain reference point. Therefore, indication signaling overheads of the MIB are reduced. In addition, the frequency domain reference point is indicated by RMSI occupying more resources. Therefore, bandwidth configurations are more flexible, fragments of the bandwidth in use are reduced, and spectrum utilization is improved.

The second sequence is used for a reference signal included in a first control channel resource set configured by the MIB, and the first control channel resource set includes a common search space, and mainly carries control information for scheduling the RMSI. The foregoing first sequence is used for the control channel resource set configured by RRC, and the first control channel resource set includes a common search space and/or a user specific search space, and mainly carries control information for scheduling data.

FIG. 17 is a schematic flowchart of another method for obtaining a reference signal sequence according to an embodiment of this application. The method includes the following parts.

Part 301: A network device obtains an initial value for generating a first sequence or length information of a first sequence.

Part 302: The network device generates the first sequence based on the initial value or the length information of the first sequence.

Part 303: The network device maps the first sequence to a resource element carrying a reference signal in a control channel resource set.

In an example, the network device sends a MIB to a terminal device, where the MIB includes indication information used to indicate a time-frequency resource occupied by the control channel resource set.

In an example, the network device sends one or more of a synchronization signal, a broadcast channel scrambling sequence, a broadcast channel reference signal, or broadcast information that includes the initial value for generating the first sequence to the terminal device.

It should be especially noted that, for how details about step 303 in which the network device maps the first sequence to the resource element carrying the reference signal in the control channel resource set, reference may be made to the embodiment shown in FIG. 2.

According to the solution shown in FIG. 17, the MIB does not include indication information of a frequency domain reference point, and therefore, indication signaling overheads of the MIB can be reduced. Therefore, the terminal device cannot obtain a position relative to the frequency domain reference, and can only directly generate a reference signal sequence, or truncate the first sequence from a center position of a reference signal sequence. Because a size of an initial access bandwidth is limited, it is less possible that control channel resource sets sent in different frequency bands in frequency domain overlap each other in frequency domain. Therefore, reuse by a plurality of users is impossible. However, a terminal device receiving RMSI can obtain the first sequence according to a reference point configured by the RMSI, and orthogonal reuse by a plurality of users, that is, MU-MIMO, can be implemented in an overlapping resource region between a plurality of control channel resource sets.

FIG. 18 is another method for obtaining a reference signal sequence according to an embodiment of this application. The method includes the following parts.

Part 401: A terminal device obtains an initial value for generating a first sequence or length information of a sequence.

Part 402: The terminal device generates the first sequence based on the initial value or the length information of the first sequence.

Part 403: The terminal device demodulates, by using the first sequence, a control channel signal carried in a control channel resource set, to obtain downlink control information.

In an example, the method further includes: the terminal device receives a MIB, where the MIB includes indication information used to indicate a time-frequency resource occupied by the control channel resource set; and that a terminal device obtains length information of a first sequence includes: determining a length of the first sequence according to the indication information used to the time-frequency resource occupied by the control channel resource set.

In an example, that a terminal device obtains an initial value for generating a first sequence includes: the terminal device obtains one or more of a synchronization signal, a broadcast channel scrambling sequence, a broadcast channel reference signal, or broadcast information that includes the initial value for generating the first sequence.

It should be noted that, the embodiment shown in FIG. 17 may be used in combination with the embodiment shown in FIG. 18. A sequence of steps in the combined process may comply with sequences of steps in FIG. 17 and FIG. 18, or may not comply with sequences of steps in FIG. 17 and FIG. 18. This is not limited.

It should be especially noted that, for how the terminal demodulates, by using the first sequence, the control channel signal carried in the control channel resource set, to obtain the downlink control information, reference may be made to the embodiment shown in FIG. 2. Details are not described again herein.

In an example, that a terminal device obtains length information of the first sequence in step 401 may include: the terminal device generates the first sequence, where a length of the first sequence is indicated by a MIB.

In another example, the terminal device may generate the initial value of the first sequence by using one or more configurations of a synchronization signal, a broadcast channel scrambling sequence, a broadcast channel reference signal, or broadcast information. This ensures randomicity of a reference signal sequence used in the control channel resource set, and can avoid interference caused by another cell to a reference signal in the control channel resource set.

For example, the initial value of the first sequence may be determined by using a formula (5):

$$c_{init} = (n_s + 1) \cdot \left(2n_{ID}^{CSS} + 1\right) \cdot 2^{16} + n_{ID} \tag{5}$$

where $n_{ID}$ is configured by indication information carried in the MIB, but $n_{ID}^{CSS}$ is a predefined value; or $n_{ID}^{CSS}$ may be configured by indication information carried in broadcast information, but $n_{ID}$ is a predefined value.

For example, the MIB includes the information used to indicate the time-frequency resource occupied by the control channel resource set, and/or configuration information of a reference signal resource included in the control channel resource set.

For example, the terminal device may determine the length of the first sequence according to a size of the time-frequency resource, occupied by the control channel resource set and included in the MIB.

For example, a quantity of physical resource blocks included in the control channel resource set in frequency domain and configured by the MIB is $N^{CORESET}_{RB}$, a quantity of OFDM symbols included in time domain is $M^{CORESET}_{os}$, and the system specifies in advance that a quantity of resources occupied by a reference signal included in each REG is $N^{REG}_{RS}$. In this case, the length of the first sequence is $N^{REG}_{RS} \cdot N^{CORESET}_{BR} \cdot M^{CORESET}_{os}$.

For another example, as shown in Table 8, the configuration information indicates that a quantity of resource elements included in the REG and used for mapping the reference signal is 3; and it is determined, based on the quantity $N^{CORESET}_{RB}$ of physical resource blocks included in the control channel resource set in frequency domain and the quantity $M^{CORESET}_{os}$ of OFDM symbols included in time domain, that the length of the first sequence is $3 \cdot N^{CORESET}_{RB} \cdot M^{CORESET}_{os}$.

TABLE 8

| Indication information | Quantity of REs of a reference signal ($N_{RS}^{REG}$) |
|---|---|
| 00 | 3 |
| 01 | 2 |
| 11 | 4 |

According to this solution, the MIB does not include indication information of a frequency domain reference point, and therefore, indication signaling overheads of the MIB can be reduced. Therefore, the terminal device cannot obtain a position relative to the frequency domain reference, and can only directly generate a reference signal sequence, or truncate the first sequence from a center position of a reference signal sequence. Because a size of an initial access bandwidth is limited, it is less possible that control channel resource sets sent in different frequency bands in frequency domain overlap each other in frequency domain. Therefore, reuse by a plurality of users is impossible. However, a terminal device receiving RMSI can obtain the first sequence according to a reference point configured by the RMSI, and orthogonal reuse by a plurality of users, that is, MU-MIMO, can be implemented in an overlapping resource region between a plurality of control channel resource sets.

For example, the correspondence between the indication information and the quantity of REs of the reference signal may be predefined by a network device and the terminal device, or may be specified by a protocol, or may be preconfigured. This is not specifically limited in this application, and shall fall within the protection scope of this application as long as the correspondence between the indication information in the broadcast channel and the quantity of REs of the reference signal can be reflected.

FIG. 19 is another method for obtaining a reference signal according to an embodiment of this application. The method includes the following parts.

Part 501: A terminal device generates a broadcast channel reference signal sequence.

Figure 20:
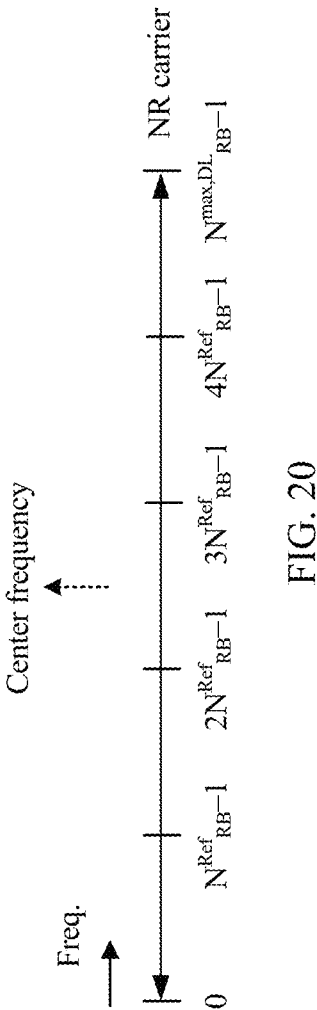
FIG. 20 is a schematic diagram of a sequence truncated from a reference signal sequence of a reference point of a broadcast channel.

For example, the terminal device may generate the broadcast channel reference signal sequence by using a formula (6):

$$r(m) = \frac{1}{\sqrt{2}}(1 - 2 \cdot c(2m)) + j\frac{1}{\sqrt{2}}(1 - 2 \cdot c(2m + 1)), \quad (6)$$

$$m = 0, 1, \ldots , 8N_{RB}^{max,DL} - 1$$

where $N^{max,DL}{}_{RB}$ indicates a maximum quantity of a physical resource blocks included in a system bandwidth; because a quantity of OFDM symbols occupied by a broadcast channel is 2 (which may be consecutive or discrete), the reference signal sequence is mapped to a first OFDM symbol and a second OFDM symbol in ascending order of frequencies, as shown in FIG. 20.

It should be especially noted that, a time-frequency resource position of a broadcast channel reference signal is merely an example for understanding this embodiment of this application. This application includes but is not limited to this. In other words, other manners may be used in 5G to describe a resource position to which a broadcast channel reference signal is mapped.

Part 502: A network device sends a broadcast channel reference signal to the terminal device, where the broadcast channel reference signal includes a subset of the broadcast channel reference signal sequence.

For example, a correspondence between the subset of the reference signal sequence and a ninth relative position is predefined, as shown in Table 9. The broadcast reference signal sequence is determined according to a correspondence between subsets of different reference signal sequences and different relative positions.

TABLE 9

| Subset of a reference signal sequence | Ninth relative position |
|---|---|
| 0 | $-2N_{RB}{}^{Offset}$ |
| 1 | $-N_{RB}{}^{Offset}$ |
| 2 | 0 |
| 3 | $+N_{RB}{}^{Offset}$ |
| 4 | $+2N_{RB}{}^{Offset}$ |

For example, FIG. 20 provides a sequence truncated from a broadcast channel reference signal sequence included in a broadcast channel 2, where numbers of elements in a reference signal sequence number included in a broadcast channel reference signal on a first OFDM symbol are $\{2N^{max,DL}{}_{RB}-2N^{PBCH}{}_{RB}+N^{Offset}{}_{RB}, \ldots, 2N^{max,DL}{}_{RB}+2N^{PBCH}{}_{RB+N}{}^{Offset}{}_{RB}-1\}$; and numbers of elements in a reference signal sequence included on a second OFDM symbol is $\{6N^{max,DL}{}_{RB}-2N^{PBCH}{}_{RB}+N^{Offset}{}_{RB}, \ldots, 2N^{max,DL}{}_{RB}-2N^{PBCH}{}_{RB}+N^{Offset}{}_{RB}-1\}$.

For example, the correspondence between the subset of the reference signal sequence and the ninth relative position may be predefined by the network device and the terminal device, or may be specified by a protocol, or may be preconfigured. This is not specifically limited in this application, and shall fall within the protection scope of this application as long as the correspondence between the subset of the broadcast channel reference signal sequence and the ninth relative position can be reflected.

For example, a frequency domain reference point may be a minimum frequency within a system bandwidth in frequency domain, or a maximum frequency within a system bandwidth in frequency domain. Details are not described herein.

For example, the terminal device determines, by blindly detecting the reference signal sequence, a frequency domain position of the received broadcast channel, or determines frequency domain offset information of the broadcast channel relative to a reference position of the system bandwidth in frequency domain.

Part 503: The terminal device receives the broadcast channel reference signal sent by the network device, where the broadcast channel reference signal includes the subset of the broadcast channel reference signal sequence.

Part 504: The network device sends a MIB to the terminal device, where the MIB includes indication information used to indicate a tenth relative position of the control channel resource set relative to a broadcast channel.

Part 505: The terminal device receives the MIB.

Part 506: The terminal device obtains position offset information based on a ninth relative position corresponding to the subset of the broadcast channel reference signal sequence and the tenth relative position indicated by the indication information of the tenth relative position.

Part 507: The terminal device obtains a first sequence based on the position offset information.

For example, the first sequence is a subset of a control channel reference signal sequence.

For example, the control channel reference signal sequence is a pseudo random aperiodic sequence, and may be obtained according to a formula (7):

$$r(m) = \frac{1}{\sqrt{2}}(1 - 2 \cdot c(2m)) + j\frac{1}{\sqrt{2}}(1 - 2 \cdot c(2m + 1)), \quad (7)$$

$$m = 0, 1, \ldots , 4N_{RB}^{max,DL} - 1$$

where $$N_{RB}^{max,DL}$$

is a maximum quantity of a physical resource blocks included in the system bandwidth. In this embodiment, the control channel resource set occupies one OFDM symbol in time domain, and each REG in the control channel resource set includes four resource elements used for mapping reference signals. The REG includes resource elements of control information and resource elements carrying the reference signal.

For another example, the control channel reference signal sequence is a pseudo periodic sequence, and may be obtained according to a formula (8):

$$r(m) = \frac{1}{\sqrt{2}}(1 - 2 \cdot c(2m)) + j\frac{1}{\sqrt{2}}(1 - 2 \cdot c(2m + 1)), \qquad (8)$$

$$\text{where } m = 0, 1, \dots , 4N_{RB}^{Ref} - 1$$

Figure 21:
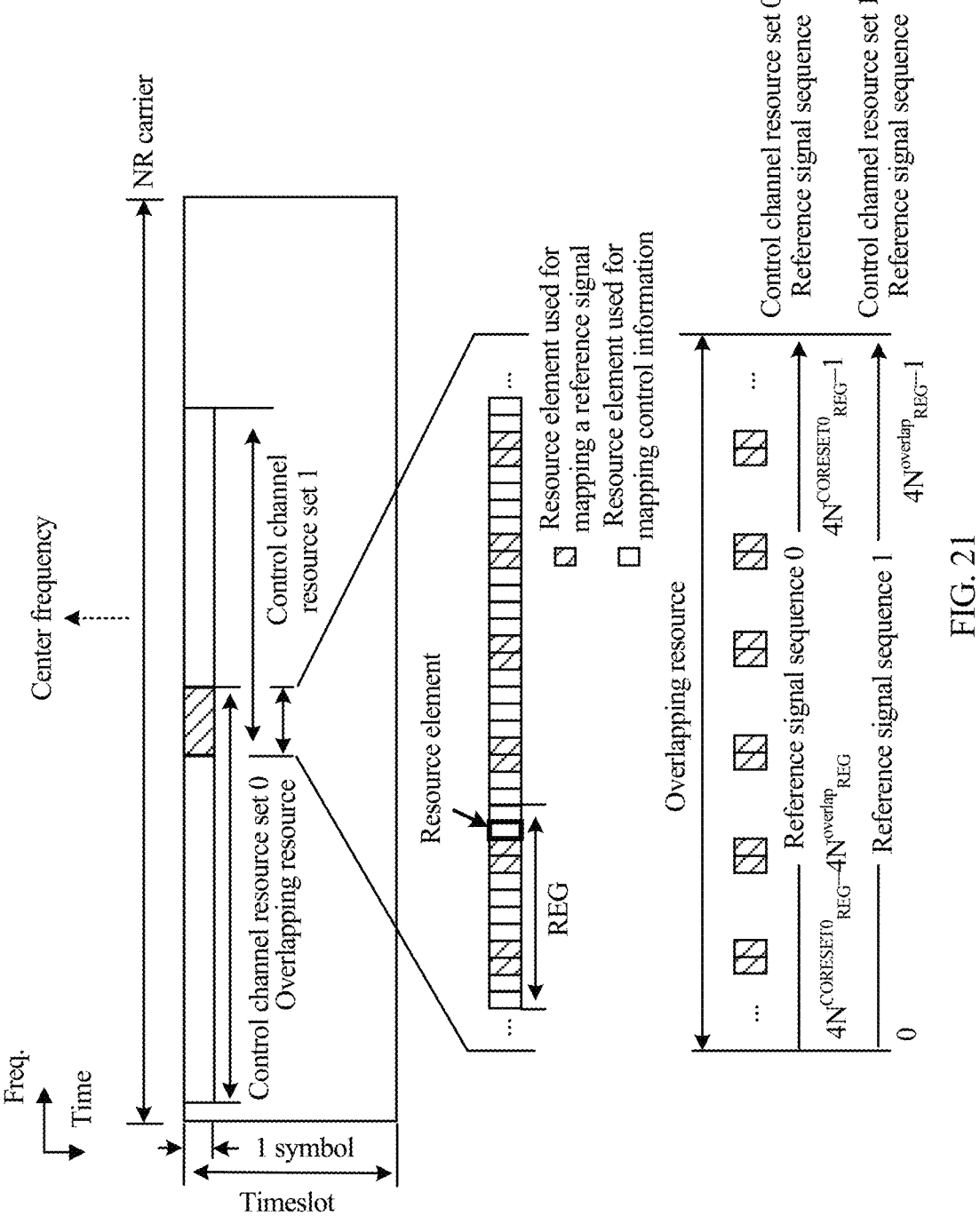
FIG. 21 is a schematic diagram of a reference signal sequence mapping according to an embodiment of this application.

A length of the control channel reference signal sequence includes only $N^{Ref}_{RB}$, where $N^{Ref}_{RB}$ indicates a quantity of resource blocks, and $N^{Ref}_{RB} < N^{max,DL}_{RB}$, where $N^{max,DL}_{RB}$ is a maximum quantity of a physical resource blocks included in the system bandwidth. However, the control channel reference signal sequence may be mapped to a whole carrier in a repetition manner, as shown in FIG. 21.

Part 508: The terminal device demodulates and decodes the control channel, by using the first sequence, a control channel carried in the control channel resource set, to obtain control information.

For a specific method for demodulating and decoding the control channel, and obtaining the control information, refer to a method for demodulating and decoding the control channel, and obtaining control information in the LTE network. Details are not excessively described in this application.

The foregoing describes the solutions provided by the embodiments of this application from a perspective of interaction between network elements. It may be understood that, to implement the foregoing functions, each network element, for example, UE, a base station, or a core network entity, includes a corresponding hardware structure and/or a software module for performing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

An embodiment of this application provides a terminal device. The apparatus including:

a processor 601, configured to control actions of the terminal device, and perform processing performed by the terminal device in the embodiment shown in FIG. 2, for example, configured to obtain position offset information, obtain a first sequence based on the position offset information, and demodulate, by using the first sequence, a control channel signal carried in a control channel resource set, to obtain downlink control information.

For example, the processor is further configured to generate a reference signal sequence; and the processor is specifically configured to obtain the first sequence from the reference signal sequence based on the position offset information, where the first sequence is a subset of the reference signal sequence, and the position offset information is a position of at least one value of the first sequence in the reference signal sequence.

Figure 22:
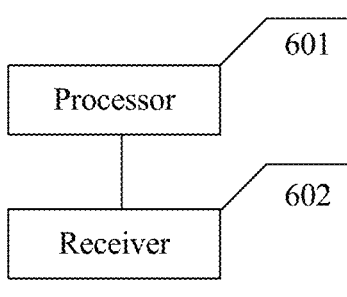
FIG. 22 is another schematic diagram of a reference signal sequence mapping according to an embodiment of this application.

For example, as shown in FIG. 22, the terminal device further includes a receiver 602, configured to receive a master information block MIB sent by a network device, where the MIB includes indication information used to indicate a first relative position and indication information used to indicate a second relative position, the first relative position is a position of a reference point of a broadcast channel carrying the MIB, relative to a frequency domain reference point, and the second relative position is a relative position of the control channel resource set relative to the reference point of the broadcast channel; and the processor is specifically configured to determine the position offset information according to the first relative position indicated by the indication information of the first relative position and the second relative position indicated by the indication information of the second relative position that are received by the receiving module 602.

For example, the terminal device further includes a receiver 602, configured to receive a MIB sent by a network device, where the MIB includes indication information used to indicate a third relative position, and the third relative position is a position of a reference point of a broadcast channel carrying the MIB, relative to a frequency domain reference point; and the processor is specifically configured to determine the position offset information according to the third relative position indicated by the indication information of the third relative position that is received by the receiver and a fourth relative position, where the fourth relative position is a relative position of the control channel resource set relative to the reference point of the broadcast channel, and the fourth relative position is configured or preset.

For example, the processor is further configured to instruct the receiver 602 to receive a MIB sent by a network device, where the MIB includes indication information used to indicate eighth relative position information of the control channel resource set relative to a frequency domain reference point; and the processor is specifically configured to determine the position offset information according to the eighth relative position indicated by the indication information of the eighth relative position.

For example, the terminal device further includes a receiver 602, configured to receive configuration information of the bandwidth subset includes indication information of a fifth relative position, and the fifth relative position is a relative position of a system bandwidth subset of the control channel resource set relative to a frequency domain reference point; and the processor is specifically configured to determine the position offset information according to the fifth relative position indicated by the indication information of the fifth relative position that is received by the receiver.

For example, the terminal device further includes a receiver 602, configured to receive configuration information of a system bandwidth subset, where the configuration information of the subset includes indication information of a sixth relative position and indication information of a seventh relative position, the sixth relative position is a relative position of a system bandwidth subset of the control channel resource set relative to a reference point of a broadcast channel carrying a MIB, and the seventh relative position is a position of the reference point of the broadcast channel carrying the MIB, relative to a frequency domain reference point; and the processor is specifically configured to determine the position offset information according to the sixth relative position indicated by the indication information of the sixth relative position and the seventh relative position indicated by the indication information of the seventh relative position that are received by the receiver.

For example, the processor is further configured to instruct a receiver to receive configuration information of the control channel resource set, where the configuration information of the control channel resource set includes indication information used to indicate the position offset information.

For example, the processor is specifically configured to: when the indication information used to indicate the position offset information includes indication information used to indicate a physical resource block number of the control channel resource set, determine the position offset information according to a physical resource block indicated by the physical resource block number.

For example, the configuration information of the control channel resource set includes at least one of a random access response RAR and radio resource control RRC signaling, and the control channel resource set includes a type-1 common search space CSS and/or a terminal specific search space USS.

The terminal device further includes a receiver 602, configured to receive a master information block MIB sent by a network device, where the MIB includes indication information used to indicate an eleventh relative position of the control channel resource set relative to a reference point of a broadcast channel carrying the MIB; and the processor 601 is specifically configured to obtain a second sequence from the reference signal sequence according to the eleventh relative position, where the second sequence is a subset of the reference signal sequence, and the eighth relative position is a position of at least one value of the second sequence in the reference signal sequence.

For example, the terminal device may further include a memory 603, configured to store program code and data of the terminal device.

For example, the terminal device may further include a transmitter 604 and a modem processor 605. The transmitter 604 is configured to adjust (for example, perform analog conversion, filtering, amplification, and up-conversion) an output sample and generate an uplink signal, where the uplink signal is transmitted to the network device in the foregoing embodiment by using an antenna. On a downlink, the antenna receives a downlink signal transmitted by the network device in the foregoing embodiment. The receiver 602 adjusts (for example, performs filtering, amplification, down-conversion, and digitization) the signal received from the antenna and provides an input sample. In the modem processor 605, an encoder receives service data and a signaling message to be sent on an uplink, and performs processing (for example, format conversion, encoding, and interleaving) on the service data and signaling message. A modulator further processes (for example, performs symbol mapping and modulation) the encoded service data and signaling message and provides an output sample. A demodulator processes (for example, demodulates) the input sample and provides a symbol estimation. A decoder processes (for example, de-interleaves and decodes) the symbol estimation and provides data and a signaling message that are decoded and sent to the terminal device. The encoder, the modulator, the demodulator, and the decoder may be implemented by a composite modem processor 605. The units perform processing based on a radio access technology (for example, access technology of LTE system or another evolved systems) used by a radio access network.

It should be especially noted that, for beneficial effects of this embodiment, reference may be made to the method embodiment shown in FIG. 2. Details are not described again herein.

An embodiment of this application further provides a network device, including:

a processor 701, configured to control actions of the network device, and perform processing performed by the network device in the embodiment shown in FIG. 2. For example, the processor is configured to obtain position offset information, obtain a first sequence based on the position offset information, and map the first sequence to a resource element carrying a reference signal in a control channel resource set.

For example, the processor is configured to generate a reference signal sequence, and obtain the first sequence from the reference signal sequence based on the position offset information, where the first sequence is a subset of the reference signal sequence, and the position offset information is a position of at least one value of the first sequence in the reference signal sequence.

Figure 23:
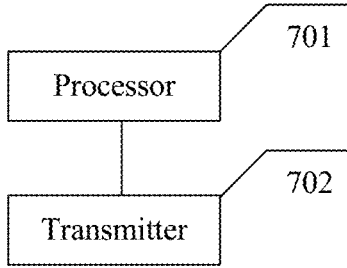
FIG. 23 is an apparatus for obtaining a reference signal according to an embodiment of this application.

For example, as shown in FIG. 23, the network device further includes a transmitter 702, configured to send a MIB to a terminal device, where the MIB includes indication information of a first relative position and indication information of a second relative position, the first relative position is a position of a reference point of a broadcast channel carrying the MIB, relative to a frequency domain reference point, the second relative position is a relative position of the control channel resource set relative to the reference point of the broadcast channel, and the indication information of the first relative position and the indication information of the second relative position are used to indicate the position offset information.

For example, the network device further includes a transmitter 702, configured to send a MIB to a terminal device, where the MIB includes indication information of a third relative position, the third relative position is a position of a reference point of a broadcast channel carrying the MIB, relative to a frequency domain reference point, the indication information of the third relative position is used with a fourth relative position to indicate the position offset information, the fourth relative position is a relative position of the control channel resource set relative to the reference point of the broadcast channel, and the fourth relative position is configured or preset.

For example, the network device further includes a transmitter 702, configured to send a master information block MIB to a terminal device, where the MIB includes indication information used to indicate eighth relative position information of the control channel resource set relative to a frequency domain reference point, and the indication information of the eighth relative position information is used to indicate the position offset information.

For example, the network device further includes a transmitter 702, configured to send configuration information of a system bandwidth subset to a terminal device, where the configuration information of the subset includes indication information of a fifth relative position, the fifth relative position is a relative position of a system bandwidth subset of the control channel resource set relative to a frequency domain reference point, and the indication information of the fifth relative position is used to indicate the position offset information.

For example, the network device further includes a transmitter 702, configured to send configuration information of a system bandwidth subset to a terminal device, where the configuration information of the subset includes indication information of a sixth relative position and indication information of a seventh relative position, the sixth relative position is a relative position of a system bandwidth subset of the control channel resource set relative to a reference point frequency domain position of a broadcast channel carrying a MIB, the seventh relative position is a position of the reference point of the broadcast channel carrying the MIB, relative to a frequency domain reference point, and the indication information of the sixth relative position and the indication information of the seventh relative position are used to indicate the position offset information.

For example, the network device further includes a transmitter 702, configured to send configuration information of the control channel resource set to a terminal device, where the configuration information of the control channel resource set includes indication information used to indicate the position offset information.

The indication information used to indicate the position offset information includes indication information used to indicate a physical resource block number of the control channel resource set.

For example, the network device further includes a transmitter 702, configured to send a master information block MIB, where the MIB includes indication information used to indicate an eleventh relative position of the control channel resource set relative to a reference point of a broadcast channel carrying the MIB.

For example, the configuration information of the control channel resource set includes at least one of a random access response RAR and radio resource control RRC signaling, and the control channel resource set includes a type-1 common search space CSS and/or a terminal specific search space USS.

It may be understood that FIG. 23 shows only a simplified design of the network device. In an actual application, the network device may include any quantity of transmitters, receivers, processors, controllers, memories, communications units, and the like, and all network devices that can implement this application shall fall within the protection scope of this application.

It should be especially noted that, for beneficial effects of this embodiment, reference may be made to the method embodiment shown in FIG. 2. Details are not described again herein.

An embodiment of this application further provides a terminal device, including:

a processor 801, configured to control actions of the terminal device, and perform processing performed by the terminal device in the embodiment shown in FIG. 18, for example, configured to obtain an initial value for generating a first sequence or length information of a first sequence, generate the first sequence based on the initial value or the length information of the first sequence, and demodulate, by using the first sequence, a control channel signal carried in a control channel resource set, to obtain downlink control information.

Figure 24:
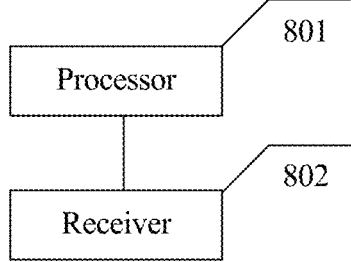
FIG. 24 is another apparatus for obtaining a reference signal according to an embodiment of this application.

For example, as shown in FIG. 24, the terminal device further includes a receiver 802, configured to receive a MIB, where the MIB includes indication information used to indicate a time-frequency resource occupied by the control channel resource set; and the processor is specifically configured to determine a length of the first sequence according to the indication information used to indicate the time-frequency resource occupied by the control channel resource set.

For example, the processor is specifically configured to obtain one or more of a synchronization signal, a broadcast channel scrambling sequence, a reference signal, or broadcast information that includes the initial value for generating the first sequence.

For example, the terminal device may further include a memory 803, configured to store program code and data of the terminal device.

For example, the terminal device may further include a transmitter 804 and a modem processor 805. The transmitter 804 is configured to adjust (for example, perform analog conversion, filtering, amplification, and up-conversion) an output sample and generate an uplink signal, where the uplink signal is transmitted to the network device in the foregoing embodiment by using an antenna. On a downlink, the antenna receives a downlink signal transmitted by the network device in the foregoing embodiment. The receiver 802 adjusts (for example, performs filtering, amplification, down-conversion, and digitization) the signal received from the antenna and provides an input sample. In the modem processor 805, an encoder receives service data and a signaling message to be sent on an uplink, and performs processing (for example, formatting, encoding, and interleaving) on the service data and signaling message. A modulator further processes (for example, performs symbol mapping and modulation) the encoded service data and signaling message and provides an output sample. A demodulator processes (for example, demodulates) the input sample and provides a symbol estimation. A decoder processes (for example, de-interleaves and decodes) the symbol estimation and provides data and a signaling message that are decoded and sent to the terminal device. The encoder, the modulator, the demodulator, and the decoder may be implemented by a composite modem processor 805. The units perform processing based on a radio access technology (for example, an access technology of LTE system or another evolved systems) used by a radio access network.

It should be especially noted that, for beneficial effects of this embodiment, reference may be made to the method embodiment shown in FIG. 18. Details are not described again herein.

An embodiment of this application further provides a network device. The network device including:

a processor 901, configured to control actions of the network device, and perform processing performed by the network device in the embodiment shown in FIG. 17. For example, the processor is configured to obtain an initial value for generating a first sequence or length information of the first sequence, generate the first sequence based on the initial value or the length information of the first sequence, and map the first sequence to a resource element carrying a reference signal in a control channel resource set.

Figure 25:
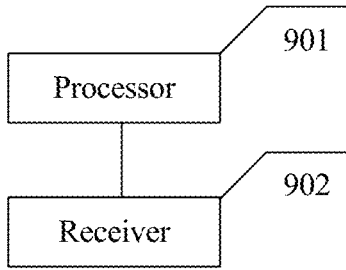
FIG. 25 is another apparatus for obtaining a reference signal according to an embodiment of this application.

For example, as shown in FIG. 25, the network device further includes a transmitter 902, configured to send a MIB to a terminal device, where the MIB includes indication information used to indicate a time-frequency resource occupied by the control channel resource set.

For example, the apparatus further includes a transmitter, configured to send one or more of a synchronization signal, a broadcast channel scrambling sequence, a broadcast channel reference signal, or broadcast information that includes the initial value for generating the first sequence to the terminal device.

It may be understood that FIG. 25 shows only a simplified design of the network device. In an actual application, the network device may include any quantity of transmitters, receivers, processors, controllers, memories, communications units, and the like, and all network devices that can implement this application shall fall within the protection scope of this application.

It should be especially noted that, for beneficial effects of this embodiment, reference may be made to the method embodiment shown in FIG. 17. Details are not described again herein.

Figures 26, 27:
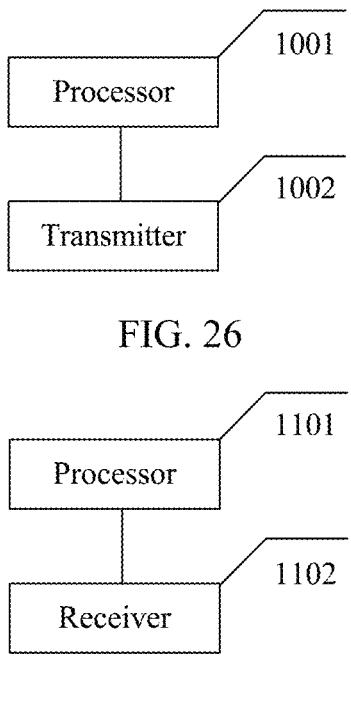
FIG. 26 is another apparatus for obtaining a reference signal according to an embodiment of this application.
FIG. 27 is another apparatus for obtaining a reference signal according to an embodiment of this application.

FIG. 26 shows a network device used in the foregoing embodiment. The network device is configured to perform processing performed by the network device in the embodiment shown in FIG. 19. The apparatus includes a processor 1001 and a transmitter 1002.

The processor 1001 is configured to generate a broadcast channel reference signal, where the broadcast channel reference signal includes a subset of a broadcast channel reference signal sequence.

The transmitter 1002 is configured to send the broadcast channel reference signal generated by the processor to a terminal device, and send a MIB to the terminal device, where the MIB includes indication information used to indicate a tenth relative position of the control channel resource set relative to the broadcast channel, and the subset of the broadcast channel reference signal sequence and the indication information of the tenth relative position are used to indicate position offset information.

It may be understood that FIG. 26 shows only a simplified design of the network device. In an actual application, the network device may include any quantity of transmitters, receivers, processors, controllers, memories, communications units, and the like, and all network devices that can implement this application shall fall within the protection scope of this application.

It should be especially noted that, for beneficial effects of this embodiment, reference may be made to the method embodiment shown in FIG. 19. Details are not described again herein.

FIG. 27 shows a terminal device used in the foregoing embodiment. The terminal device is configured to perform processing performed by the terminal device in the embodiment shown in FIG. 19. The terminal device includes a processor 1101 and a receiver 1102.

The processor 1101 is configured to generate a broadcast channel reference signal sequence.

The receiver 1102 is configured to: receive the broadcast channel reference signal sent by a network device, where the broadcast channel reference signal includes a subset of the broadcast channel reference signal sequence; and receive a MIB sent by the network device, where the MIB includes indication information used to indicate a tenth relative position of the control channel resource set relative to the broadcast channel.

The processing module is configured to obtain position offset information based on a ninth relative position corresponding to the subset of the broadcast channel reference signal sequence received by the receiver 1102 and the tenth relative position indicated by the indication information of the tenth relative position, and demodulate and decode, by using the first sequence, a control channel carried in the control channel resource set, to obtain control information.

For example, the terminal device may further include a memory 1103, configured to store program code and data of the terminal device.

For example, the terminal device may further include a transmitter 1104 and a modem processor 1105. The transmitter 1104 is configured to adjust (for example, perform analog conversion, filtering, amplification, and up-conversion) an output sample and generate an uplink signal, where the uplink signal is transmitted to the network device in the foregoing embodiment by using an antenna. On a downlink, the antenna receives a downlink signal transmitted by the network device in the foregoing embodiment. The receiver 1102 adjusts (for example, performs filtering, amplification, down-conversion, and digitization) the signal received from the antenna and provides an input sample. In the modem processor 1105, an encoder receives service data and a signaling message to be sent on an uplink, and performs processing (for example, formatting, encoding, and interleaving) on the service data and signaling message. A modulator further processes (for example, performs symbol mapping and modulation) the encoded service data and signaling message and provides an output sample. A demodulator processes (for example, demodulates) the input sample and provides a symbol estimation. A decoder processes (for example, de-interleaves and decodes) the symbol estimation and provides data and a signaling message that are decoded and sent to the terminal device. The encoder, the modulator, the demodulator, and the decoder may be implemented by a composite modem processor 1105. The units perform processing based on a radio access technology (for example, an access technology of LTE system and another evolved systems) used by a radio access network.

It should be especially noted that, for beneficial effects of this embodiment, reference may be made to the method embodiment shown in FIG. 19. Details are not described again herein.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the terminal device in the method embodiment in shown in FIG. 2.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the network device in the method embodiment in shown in FIG. 2.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the network device in the method embodiment in shown in FIG. 17.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the terminal device in the method embodiment in shown in FIG. 18.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the terminal device in the method embodiment in shown in FIG. 19.

An embodiment of this application provides a communications apparatus, including: a memory, configured to store computer executable program code; a communications interface; and a processor. The processor is coupled with the memory and the communications interface. The program code stored in the memory includes an instruction, and when the processor executes the instruction, the communications apparatus has a function for performing actions of the network device in the embodiment in FIG. 19.

An embodiment of this application provides a computer readable storage medium, where the computer readable storage medium stores an instruction, and when a computer runs the instruction, the computer has a function for performing actions of the network device in the method embodiment in shown in FIG. 2.

An embodiment of this application provides a computer readable storage medium, where the computer readable storage medium stores an instruction, and when a computer runs the instruction, the computer has a function for performing actions of the terminal device in the method embodiment in shown in FIG. 2.

An embodiment of this application provides a computer readable storage medium, where the computer readable storage medium stores an instruction, and when a computer runs the instruction, the computer has a function for performing actions of the terminal device in the method embodiment in shown in FIG. 18.

An embodiment of this application provides a computer readable storage medium, where the computer readable storage medium stores an instruction, and when a computer runs the instruction, the computer has a function for performing actions of the network device in the method embodiment in shown in FIG. 17.

An embodiment of this application provides a computer readable storage medium, where the computer readable storage medium stores an instruction, and when a computer runs the instruction, the computer has a function for performing actions of the terminal device in the method embodiment in shown in FIG. 19.

An embodiment of this application provides a computer readable storage medium, where the computer readable storage medium stores an instruction, and when a computer runs the instruction, the computer has a function for performing actions of the network device in the method embodiment in shown in FIG. 19.

The controller or processor configured to perform the functions of the network device and the terminal device in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in the terminal device as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific embodiments. It should be understood that the foregoing descriptions are merely specific embodiments of this application, but are not intended to limit the protection scope of the present invention. Any modification, equivalent replacement, improvement, or the like made on a basis of the technical solutions of this application shall fall within the protection scope of this application.

The invention claimed is:

1. A method, comprising:

obtaining, by a terminal device, a first position and a first offset, wherein the first position is a quantity of physical resource blocks by which a smallest subcarrier within a bandwidth comprising a control channel resource set is offset from a frequency domain reference point, and wherein the first offset is a quantity of physical resource blocks by which a smallest subcarrier in the control channel resource set is offset from the smallest subcarrier within the bandwidth comprising the control channel resource set;

obtaining, by the terminal device, a demodulation reference signal sequence based on the first position and the first offset; and demodulating, by the terminal device, by using the demodulation reference signal sequence, a control channel signal carried in the control channel resource set, to obtain downlink control information.

2. The method according to claim 1, wherein:

a physical resource block number of the frequency domain reference point is 0, and the frequency domain reference point is notified by system information; or the frequency domain reference point is a candidate position of a channel raster.

3. The method according to claim 1, wherein the first position is indicated by higher layer signaling, wherein the higher layer signaling comprises radio resource control (RRC) signaling.

4. The method according to claim 1, wherein the first offset is determined based on configuration information comprised in higher layer signaling, wherein the higher layer signaling comprises radio resource control (RRC) signaling.

5. The method according to claim 1, wherein the demodulation reference signal sequence is mapped to a resource element in the control channel resource set.

6. A communication apparatus, comprising:

one or more processors; and at least one memory, wherein the at least one memory stores instructions, and when executing the instructions stored in the memory, the one or more processors executes operations comprising:

obtaining a first position and a first offset, wherein the first position is a quantity of physical resource blocks by which a smallest subcarrier within a bandwidth comprising a control channel resource set is offset from a frequency domain reference point, and wherein the first offset is a quantity of physical resource blocks by which a smallest subcarrier in the control channel resource set is offset from the smallest subcarrier within the bandwidth comprising the control channel resource set;

obtaining a demodulation reference signal sequence based on the first position and the first offset; and demodulating, by using the demodulation reference signal sequence, a control channel signal carried in the control channel resource set, to obtain downlink control information.

7. The apparatus according to claim 6, wherein:

a physical resource block number of the frequency domain reference point is 0, and the frequency domain reference point is notified by system information; or the frequency domain reference point is a candidate position of a channel raster.

8. The apparatus according to claim 6, wherein:

the first position is indicated by higher layer signaling, wherein the higher layer signaling comprises radio resource control (RRC) signaling.

9. The apparatus according to claim 6, wherein:

the first offset is determined based on configuration information comprised in higher layer signaling, wherein the higher layer signaling comprises radio resource control (RRC) signaling.

10. The apparatus according to claim 6, wherein:

the demodulation reference signal sequence is mapped to a resource element carrying a reference signal in the control channel resource set.

11. One or more non-transitory computer-readable media storing computer instructions, that when executed by one or more processors, cause a computing device to perform operations comprising:

obtaining, by a terminal device, a first position and a first offset, wherein the first position is a quantity of physical resource blocks by which a smallest subcarrier within a bandwidth comprising a control channel resource set is offset from a frequency domain reference point, and wherein the first offset is a quantity of physical resource blocks by which a smallest subcarrier in the control channel resource set is offset from the smallest subcarrier within the bandwidth comprising the control channel resource set;

obtaining, by the terminal device, a demodulation reference signal sequence based on the first position and the first offset; and demodulating, by the terminal device, by using the demodulation reference signal sequence, a control channel signal carried in the control channel resource set, to obtain downlink control information.

12. The one or more non-transitory computer-readable media according to claim 11, wherein:

a physical resource block number of the frequency domain reference point is 0, and the frequency domain reference point is notified by system information; or the frequency domain reference point is a candidate position of a channel raster.

13. The one or more non-transitory computer-readable media according to claim 11, wherein the first position is indicated by higher layer signaling, wherein the higher layer signaling comprises radio resource control (RRC) signaling.

14. The one or more non-transitory computer-readable media according to claim 11, wherein the first offset is determined based on configuration information comprised in higher layer signaling, wherein the higher layer signaling comprises radio resource control (RRC) signaling.

15. The one or more non-transitory computer-readable media according to claim 11, wherein the demodulation reference signal sequence is mapped to a resource element in the control channel resource set.

* * * * *